US010180768B1

(12) United States Patent
Capano

(10) Patent No.: US 10,180,768 B1
(45) Date of Patent: Jan. 15, 2019

(54) TECHNIQUES FOR PRESENTING INFORMATION ON A GRAPHICAL USER INTERFACE

(71) Applicant: Symantec Corporation, Mountain View, CA (US)

(72) Inventor: Gregory S. Capano, Van Nuys, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 519 days.

(21) Appl. No.: 14/219,573

(22) Filed: Mar. 19, 2014

(51) Int. Cl.
| | |
|---|---|
| *G06F 3/048* | (2013.01) |
| *G06F 3/0481* | (2013.01) |
| *G06F 3/0482* | (2013.01) |
| *G06F 3/0484* | (2013.01) |
| *H04L 12/24* | (2006.01) |

(52) U.S. Cl.
CPC ........ *G06F 3/04817* (2013.01); *G06F 3/0482* (2013.01); *G06F 3/04842* (2013.01); *G06F 3/04847* (2013.01); *H04L 41/22* (2013.01)

(58) Field of Classification Search
CPC .......... G06F 19/26; H04L 41/20–41/24; H04L 12/2424; H04L 12/2425; H04L 12/2428–12/2435; H04L 12/2458; H04L 12/2602; H04L 12/2618; H04L 12/2621; H04L 12/2689; H04L 43/04; H04L 43/045; H04L 43/14
USPC .................................................. 715/734–740
See application file for complete search history.

(56) References Cited

U.S. PATENT DOCUMENTS

| | | | | |
|---|---|---|---|---|
| 9,007,302 | B1* | 4/2015 | Bandt-Horn | G06F 3/0202 345/156 |
| 2002/0101418 | A1* | 8/2002 | Vernier | G06F 3/048 345/418 |
| 2007/0256029 | A1* | 11/2007 | Maxwell | G06F 3/0482 715/834 |
| 2010/0131881 | A1* | 5/2010 | Ganesh | G06F 17/30994 715/769 |
| 2011/0055760 | A1* | 3/2011 | Drayton | G06F 3/0482 715/834 |
| 2011/0138310 | A1* | 6/2011 | Gomez | H04L 41/082 715/769 |

(Continued)

OTHER PUBLICATIONS

Draper, Geoffrey M. (2009). Interactive radial visualizations for information retrieval and management. ProQuest Dissertations Publishing 2009 (3353980). Retrieved Jan. 19, 2016 from ProQuest Dissertations & Theses Global.*

(Continued)

*Primary Examiner* — Ariel Mercado
*Assistant Examiner* — Linda Huynh
(74) *Attorney, Agent, or Firm* — Maschoff Brennan

(57) ABSTRACT

Techniques for presenting information on a graphical user interface are disclosed. In one embodiment, the techniques may be realized as a method for presenting information on a graphical user interface including displaying a deployment map via the graphical user interface on a display unit, determining whether an input has been detected with respect to the deployment map, determining a type of input when the input has been detected, generating an updated deployment map based on the determined type of input, and displaying the updated deployment map on the display unit.

17 Claims, 16 Drawing Sheets

(56) References Cited

U.S. PATENT DOCUMENTS

| | | | |
|---|---|---|---|
| 2012/0240064 A1* | 9/2012 | Ramsay | G06T 11/00 715/762 |
| 2013/0055155 A1* | 2/2013 | Wong | G06F 8/65 715/810 |
| 2013/0111406 A1* | 5/2013 | Gebhart | G06F 3/0487 715/823 |
| 2014/0136381 A1* | 5/2014 | Joseph | G06Q 40/02 705/35 |
| 2015/0040052 A1* | 2/2015 | Noel | G06F 3/04847 715/771 |
| 2015/0121122 A1* | 4/2015 | Towstopiat | G06F 11/1471 714/4.11 |
| 2015/0229532 A1* | 8/2015 | Somaiya | H04L 41/22 715/736 |
| 2017/0010787 A1* | 1/2017 | Ranganathan | G06F 3/04842 |

OTHER PUBLICATIONS

Livnat, Y., et al. (Oct. 2005). Visual correlation for situational awareness. In Information Visualization, 2005. INFOVIS 2005. IEEE Symposium on (pp. 95-102). IEEE.*

Livnat, Y., et al. (Jun. 2005). A visualization paradigm for network intrusion detection. In Information Assurance Workshop, 2005. IAW'05. Proceedings from the Sixth Annual IEEE SMC (pp. 92-99). IEEE.*

* cited by examiner

TECHNIQUES FOR PRESENTING INFORMATION ON A GRAPHICAL USER INTERFACE

FIELD OF THE DISCLOSURE

The present disclosure relates generally to a graphical user interface and, more particularly, to techniques for presenting information on a graphical user interface.

BACKGROUND OF THE DISCLOSURE

Visualization and management of a large volume of information on a graphical user interface can often be challenging. One example of a need for visualization and management of large volumes of information is for the deployment of endpoints within a network. For instance, it is difficult for a user or administrator to easily visualize and manage endpoints deployed across a wide network on a single display and to recognize aspects of those endpoints.

In view of the foregoing, it may be understood that there may be significant problems and shortcomings associated with traditional techniques for presenting deployment information on a graphical user interface.

SUMMARY OF THE DISCLOSURE

Techniques for presenting information on a graphical user interface are disclosed. In one embodiment, the techniques may be realized as a method for displaying information on a graphical user interface comprising displaying a deployment map via the graphical user interface on a display unit, determining whether an input has been detected with respect to the deployment map, determining a type of input when the input has been detected, generating an updated deployment map based on the determined type of input, and displaying the updated deployment map on the display unit.

In accordance with other aspects of this embodiment, the deployment map includes a first region, a second region, and a third region.

In accordance with other aspects of this embodiment, the third region includes one of a plurality of endpoint icons in at least one ring.

In accordance with other aspects of this embodiment, each endpoint icon indicates information about at least one endpoint deployed within a network.

In accordance with other aspects of this embodiment, the deployment map is displayed with the plurality of endpoint icons in groups.

In accordance with other aspects of this embodiment, the display of the endpoint icons in groups is dynamically updated when a first endpoint is reassigned from a first group to a second group.

In accordance with other aspects of this embodiment, the third region includes a plurality of user icons in at least one ring, each user icon indicating information about at least one user deployed within a network.

In accordance with other aspects of this embodiment, the third region includes a plurality of software implementation icons in at least one ring, each software implementation icon indicating information about software implemented on at least one endpoint deployed within a network.

In accordance with other aspects of this embodiment, each endpoint is at least one of a desktop client, a laptop client, a mobile device, and a tablet.

In accordance with other aspects of this embodiment, the method may further include selecting one of the plurality of endpoint icons, wherein the type of input is determined to be the selection of the one endpoint icon, displaying a menu of control options associated with the selected one endpoint icon, and implementing changes to at least one endpoint deployed within the network based on a selection of a control option within the menu of control options.

In accordance with other aspects of this embodiment, the first region comprises a plurality of visualization mode icons to change a display mode of the third region, and a text search box to search the plurality of icons currently displayed in the third region.

In accordance with other aspects of this embodiment, the first region further comprises a slider to change a display of the third region from the plurality of icons to another plurality of icons.

In accordance with other aspects of this embodiment, the second region includes a plurality of selectable icons associated with at least one of the plurality of endpoint icons displayed in the deployment map based on a predetermined characteristic.

In accordance with other aspects of this embodiment, when one of the plurality selectable icons are selected, at least one of the plurality of endpoint icons having the predetermined characteristic is selected.

In accordance with other aspects of this embodiment, each endpoint icon indicates information about at least two endpoints deployed within the network when a magnification view has been selected.

In another embodiment, the techniques may be realized as a method for displaying information on a graphical user interface comprising displaying a deployment map of icons via the graphical user interface on a display unit, wherein the deployment map displays the icons in at least one ring, determining whether at least one of the icons has been selected, displaying a menu of options for the selected at least one icon, determining whether an option within the menu of options has been selected, and updating at least one endpoint based on the selected option.

In accordance with other aspects of this embodiment, the menu of options includes at least one of a monitored statistic for at least one endpoint deployed within a network and associated with the selected icon, an application of a policy to the at least one endpoint, and user information for users associated with the at least one endpoint.

In accordance with other aspects of this embodiment, the method may further include determining at least one common property between a plurality of endpoints deployed within a network, wherein each icon in the displayed deployment map corresponds to one of the plurality of endpoints, and updating the menu of options in accordance with the determined at least one common property when at least two icons have been selected.

In another embodiment, the techniques may be realized as least one non-transitory processor readable storage medium storing a computer program of instructions configured to be readable by at least one processor for instructing the at least one processor to execute a computer process for performing the method comprising displaying a deployment map via the graphical user interface on a display unit, determining whether an input has been detected with respect to the deployment map, determining a type of input when the input has been detected, generating an updated deployment map based on the determined type of input, and displaying the updated deployment map on the display unit.

In another embodiment, the techniques may be realized as a system for presenting information on a graphical user interface comprising one or more processors communicatively coupled to a network; wherein the one or more processors are configured to display a deployment map via the graphical user interface on a display unit, determine whether an input has been detected with respect to the deployment map, determine a type of input when the input has been detected, generate an updated deployment map based on the determined type of input, and display the updated deployment map.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
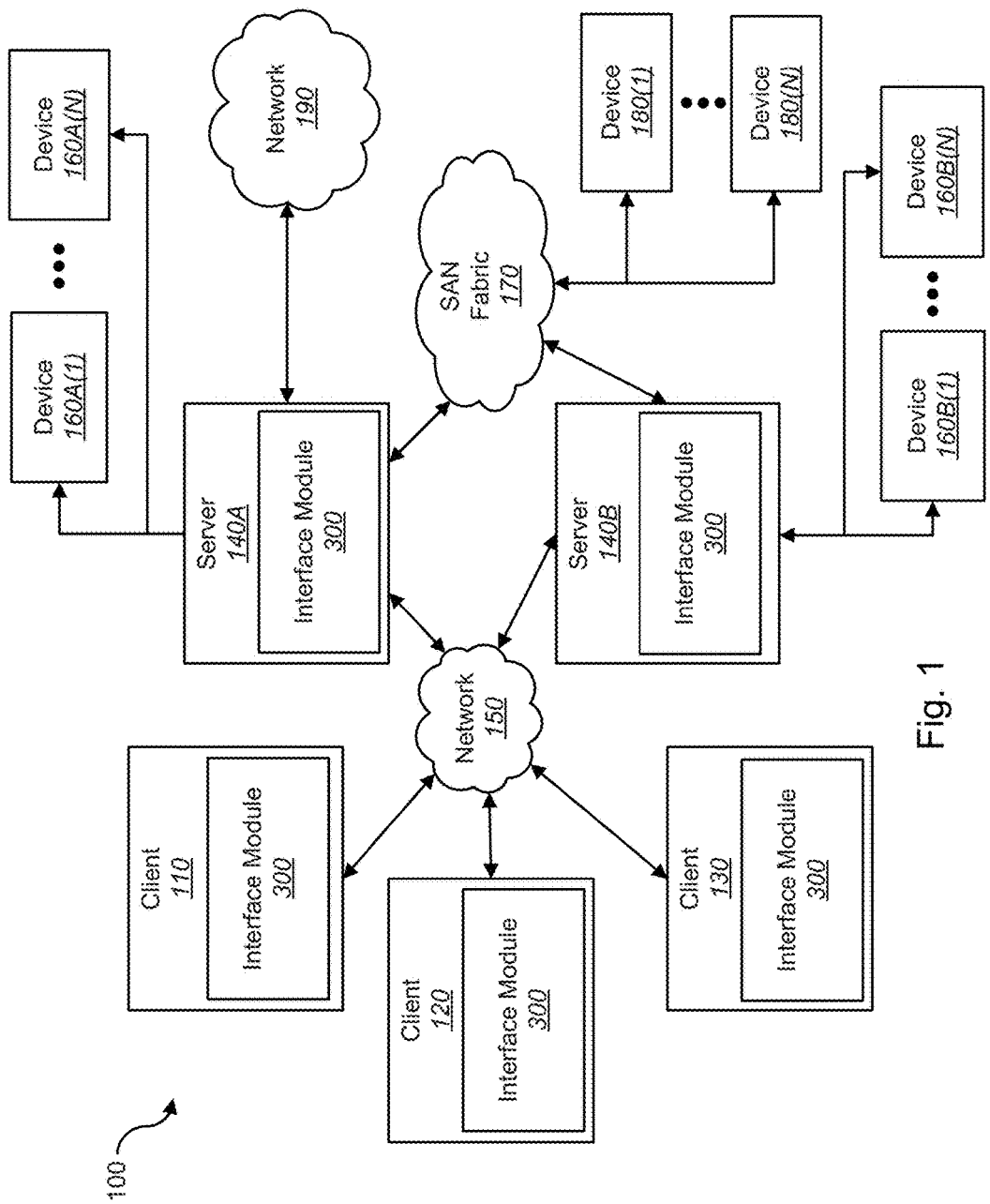
FIG. 1 shows a block diagram depicting a network architecture in accordance with an embodiment of the present disclosure.

FIG. 1 shows a block diagram depicting a network architecture 100 for presenting information on a graphical user interface in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Client systems 110, 120 and 130 may contain an interface module (e.g., interface module 300). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
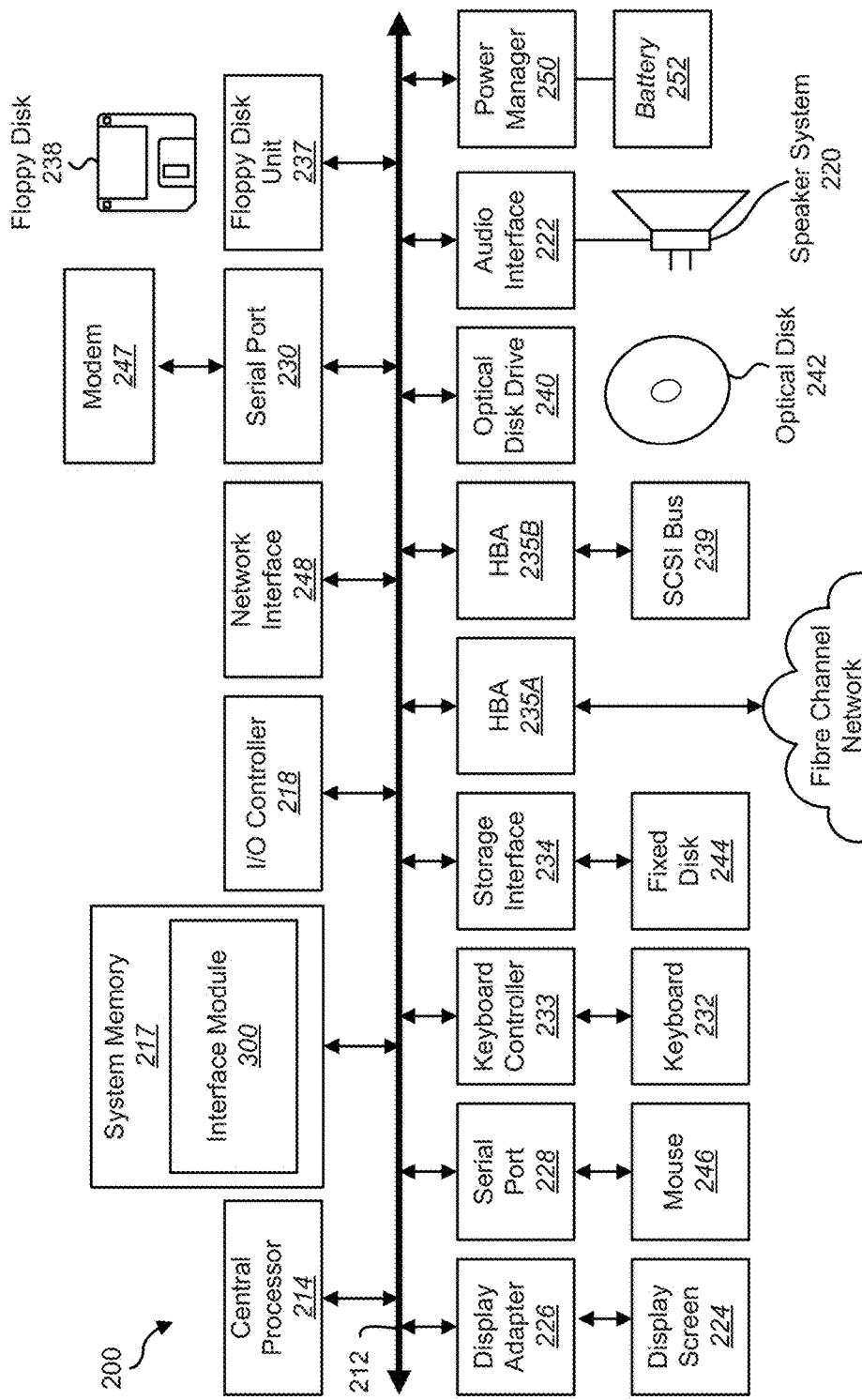
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on servers 140A and 140B using, for example, a web browser or other client software (not shown). Such a client may allow client systems 110, 120 and 130 to access data hosted by any one of servers 140A and 140B or one of storage devices 160A(1)-(N), 160B(1)-(N), and/or 180(1)-(N). In some embodiments, client systems 110, 120 and 130 may access information on servers 140A and 140B using, for example, interface module 300. Additionally, servers 140A and 140B may access information on client systems 110, 120 and 130 using, for example, interface module 300.

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to any one of servers 140A and 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for storing web content such as for example, webpages.

According to some embodiments, clients 110, 120, and 130 may be smartphones, PDAs, desktop computers, laptop computers, servers, other computers or computing devices, or other devices coupled via a wireless or wired connection to network 150. Clients 110, 120, and 130 may receive data from user input, a database, a file, a web service, and/or an application programming interface. In some embodiments, clients 110, 120, and 130 may receive data from a user input via interface module 300. Additionally, clients 110, 120, and 130 may be implemented as endpoints within the network. Each client 110, 120, and 130 endpoint may have various software implemented thereon, policies applied thereto, and be associated with a particular user and/or group. Each client 110, 120, and 130 endpoint may also report statistics to severs 140A and 140B indicating various activity at the client such as installation of new software, implementation of new policies, health statistics, any suspicious or malicious activity, and any other activity useful for an administrator to monitor.

Servers 140A and 140B may be application servers, web servers, archival platforms, backup servers, network storage devices, media servers, email servers, document management platforms, enterprise search servers, anti-malware/virus security servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. Servers 140A and 140B may also be hosts, such as web servers, to provide web content to clients.

According to some embodiments, servers 140A and 140B may be platforms used for controlling and monitoring endpoints (e.g., clients 110, 120, and 130) within the network. For instance, servers 140A and 140B may control which software is implemented on particular endpoints, group associations of endpoints and users, which policies are assigned to endpoints, which users are associated with particular endpoints, and additional aspects in relation to deployment of endpoints within the network. Servers 140A and 140B may also monitor various aspects of endpoints (e.g., clients 110, 120, and 130) within the network and display those aspects of the endpoints to enable the administrator or user to control the endpoints. Accordingly, servers 140A and 140B may contain one or more portions of software for accessing content via a graphical user interface such as, for example, interface module 300.

According to some embodiments, clients 110, 120, and 130 may contain one or more portions of software for accessing content via a graphical user interface such as, for example, interface module 300. As illustrated, one or more portions of the interface module 300 may reside at a network centric location. According to some embodiments, network 190 may be an external network (e.g., the Internet) and server 140A may be a gateway or firewall between one or more internal components and clients and the external network. According to some embodiments, the interface module 300 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g., RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, the interface module 300 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
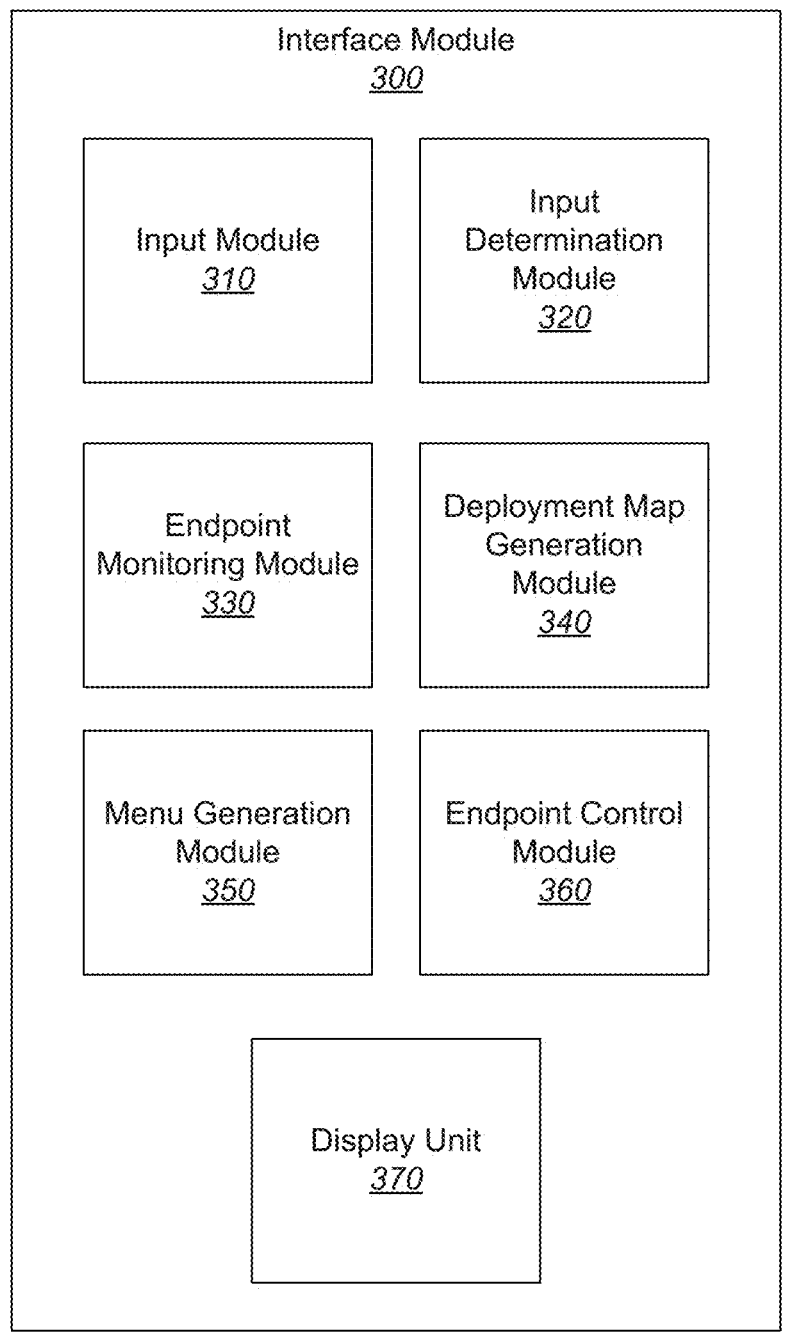
FIG. 3 shows an interface module in accordance with an embodiment of the present disclosure.

FIG. 3 shows an interface module 300 in accordance with an embodiment of the present disclosure. As illustrated, the interface module 300 may contain one or more components including an input module 310, an input determination module 320, an endpoint monitoring module 330, a deployment map generation module 340, a menu generation module 350, an endpoint control module 360, and a display unit 370.

The input module 310 may receive an input from a user. In some instances, the input may be received from a user via a I/O device such as a keyboard and/or mouse. In other instances, the input may be received from a user via a touchscreen (e.g., capacitive touchscreen).

The input determination module 320 may determine a type of input received via the input module 310. In some instance, the input determination module 320 may determine whether an input received is a selection of an endpoint, a plurality of endpoints, a text search, selection of a group of endpoints, selection of an implemented policy, a change in view of endpoints, a zoom in or zoom out view, or any other additional input.

The endpoint monitoring module 330 may monitor each endpoint in a network. In some embodiments, the endpoint monitoring module 330 may monitor various aspects of each endpoint within the network such as users associated with the endpoints, software implemented on the endpoints, policies implemented on the endpoints, group associations, health statistics, and any additional relevant information. The endpoint monitoring module 330 may also monitor each endpoint over time to track changes to each endpoint. Further, the endpoint monitoring module 330 may maintain a profile for each endpoint with the network.

The deployment map generation module 340 may generate a map of each endpoint or a subset of endpoints within the network. In some embodiments, the deployment map generation module 340 may generate the map of endpoints based on an input received via the input module 310 and based on a type of the input determined by the input determination module 320. Additionally, the deployment map generation module 340 may generate the map in accordance with the results of endpoint monitoring performed by the endpoint monitoring module 330.

The menu generation module 350 may generate a menu of options to control or modify various aspects of one or a plurality of endpoints. In some embodiments, the menu of options may be displayed concurrently with the deployment map based on an input received from a user or administrator via the input module 310. The menu of options generated by the menu generation module 350 may be used by a user or administrator to view, control, and/or modify aspects of at least one endpoint such as health statistics, applying a policy or editing a previously applied policy, performing maintenance, implementing new software privileges or modifying previous software privileges, and controlling a variety of other aspects relevant to the endpoints. In addition, the menu generation module 350 may generate a menu of options to control or modify various aspects of one or a plurality of endpoints associated with a particular user. Via this user related menu, an administrator may implement various policies or privileges across any of the endpoints associated with that user.

The endpoint control module 360 may implement any change made to one or a plurality of endpoints via the menu of options generated by the menu generation module 350. For instance, when an administrator modifies policy rights associated with a particular one or more endpoints via the menu generated by the menu generation module 350, the endpoint control module 360 may cause those changes to be implemented across the one or more endpoints. The endpoint control module 360 may also implement any changes made to at least one endpoint outside of the menu of options generated by the menu generation module 350.

The display unit 370 may display the deployment map generated by the deployment map generation module 340. Additionally, the display unit 370 may display the menus generated by the menu generation module 350 in association with the deployment map. The display unit 370 may also display any information associated with the endpoints from the endpoint monitoring module 330 and may receive an input from a user or administrator via the input module 310. In some embodiments, the display unit 370 may be a touchscreen that may receive a user input. The display unit 370 may also provide a user or administrator with an interface to control any aspect to the processes described below.

Figure 4:
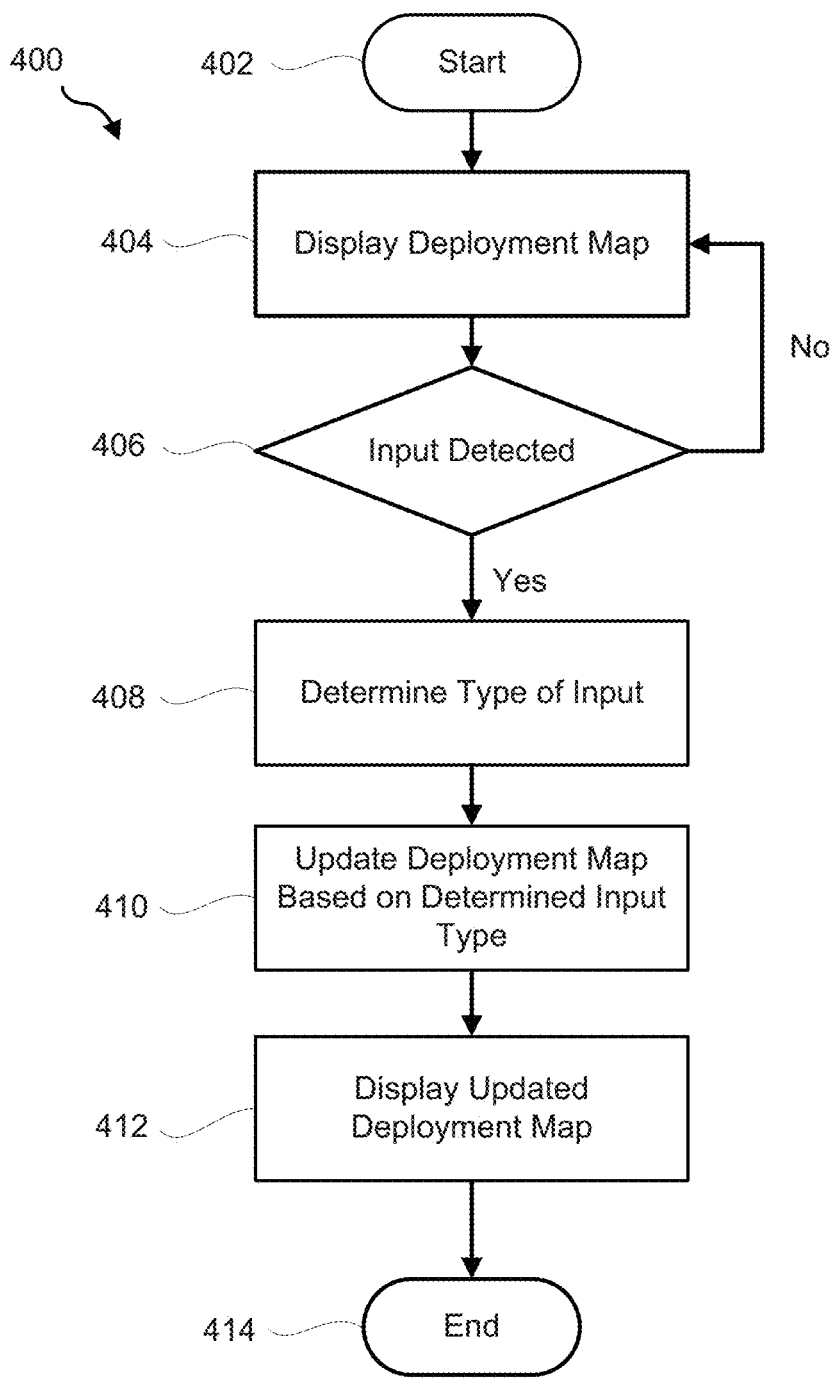
FIG. 4 shows a method for displaying content on a graphical user interface in accordance with an embodiment of the present disclosure.

FIG. 4 shows a method 400 implementing a graphical user interface in accordance with an embodiment of the present disclosure. The method 400 may be performed on any one of clients 110, 120, and 130, and servers 140A and 140B at any time. At block 402, the method 400 may begin.

At block 404, a deployment map may be displayed. In some embodiments, a deployment map generated by the deployment map generation module 340 may be displayed. In some instances, the deployment map may be displayed and viewable via the display unit 370. The deployment map may display any number of endpoints as described below with respect to FIGS. 6-16. Additionally, the deployment map may display aspects of the endpoints as described below with respect to FIGS. 6-16. After the deployment map has been displayed, the overall process may then proceed to block 406.

At block 406, it may be determined whether an input has been received. In some embodiments, the determination of whether an input has been received may be performed by the input module 310. In at least one embodiment, an input may be received from a user or administrator via an I/O device such as a keyboard or a mouse. In other instances, an input may be received from a user or administrator via a touchscreen using their finger or a stylus. When it is determined that an input has not been detected, the process may proceed back to block 404. However, when it is determined that an input has been detected, the overall process may proceed to block 408.

At block 408, a type of the input may be determined. In some embodiments, the type of input may be determined by the input determination module 320. In some instances, it may be determined that the input is a selection of one or a plurality of endpoints displayed in the deployment map. In other instances, the input may be any one of a selection of a group of endpoints, a selection of a plurality of endpoints having a same policy implemented thereon, a text-based search, a view of a different set of endpoints, a change in the number of endpoints displayed at one time, or any other input as described below with respect to FIGS. 6-16. Upon a determination of the type of input at block 408, the overall process may proceed to block 410.

At block 410, the deployment map displayed at block 404 may be updated in accordance with the input received at block 406. In some embodiments, the deployment map may be updated by the deployment map generation module 340. In some instances, the deployment map may be updated to reflect a selection of one or a plurality of endpoints, a display of a different set of endpoints, or any one of the views described below with respect to FIGS. 6-16. After the updated deployment map has been generated, the overall process may proceed to block 412.

At block 412, the updated deployment map may be displayed. In some embodiments, the updated deployment map may be displayed by the display unit 370. The overall process 400 may then repeat periodically or continuously.

Figure 5:
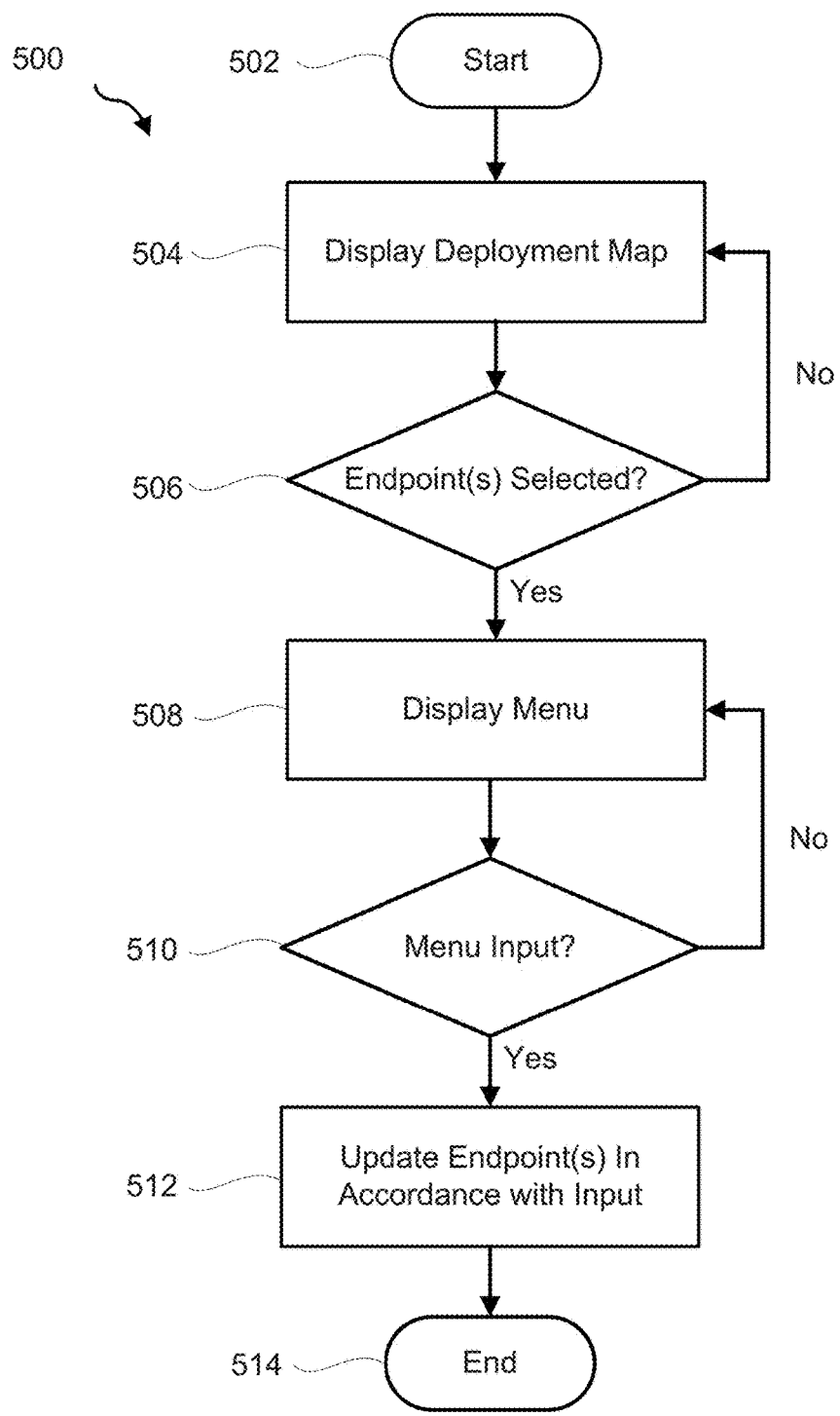
FIG. 5 shows a method for displaying content on a graphical user interface in accordance with an embodiment of the present disclosure.

FIG. 5 shows a method 500 for implementing a graphical user interface in accordance with an embodiment of the present disclosure. The method 500 may be performed on any one of clients 110, 120, and 130, and servers 140A and 140B. At block 502, the method 500 may begin.

At block 504, a deployment map may be displayed. In some embodiments, the deployment map generated by the deployment map generation module 340 may be displayed and viewable by a user or administrator via the display unit 370. The deployment map may display any number of endpoints as described below with respect to FIGS. 6-16. After the deployment map has been displayed, the overall process may then proceed to block 506.

At block 506, it may be determined whether one or a plurality of endpoints have been selected. In some embodiments, the determination of whether one or a plurality of endpoints have been selected may be performed by the input determination module 320. If it is determined that at least one endpoint displayed in the deployment map has not been selected, the overall process may proceed back to block 504. However, upon a determination that at least one endpoint displayed in the deployment map has been selected, the overall process may proceed to block 508.

At block 508, a menu of options associated with the selected at least one endpoint may be displayed. In some embodiments, the menu of options may be generated by the menu generation module 350 and displayed via the display unit 370. The menu of options may be displayed concurrently with the deployment map. One example of a menu of options is shown and described below with respect to FIG. 8. After the menu has been displayed, the overall process may process to block 510.

At block 510, it may be determined whether a menu input has been received. In some embodiments, the determination of whether a menu input has been received may be performed by the input module 310. Further, a type of the input may be determined by the input determination module 320. In some instances, the input may be the selection of an apply policy function displayed within the menu at block 50. In other instance, the input may be the selection of a health statistics tracking function, a detailed user information function, or a maintenance function. Additional instances of the input are described below with respect to FIGS. 6-16. If it is determined that no menu input has been detected, the overall process may proceed back to block 508. However, if it is determined that a menu input has been received, the overall process may proceed to block 512.

At block 512, at least one endpoint may be updated in accordance with the input received at block 510. In some embodiments, the endpoint update may be performed by the endpoint control module 360. In some instances, at least one endpoint may be updated based on an input from an administrator such as modification to an existing policy, application of a new policy, modification of users rights associated with the endpoint, or any additional aspects that a user may control via the menu displayed at block 508. However, when the input does not require the at least one endpoint to be updated (e.g. input is to view additional user statistics), the overall process may proceed to block 514 without updating the at least one endpoint. The overall process 500 may repeat periodically or continuously.

Figure 6:
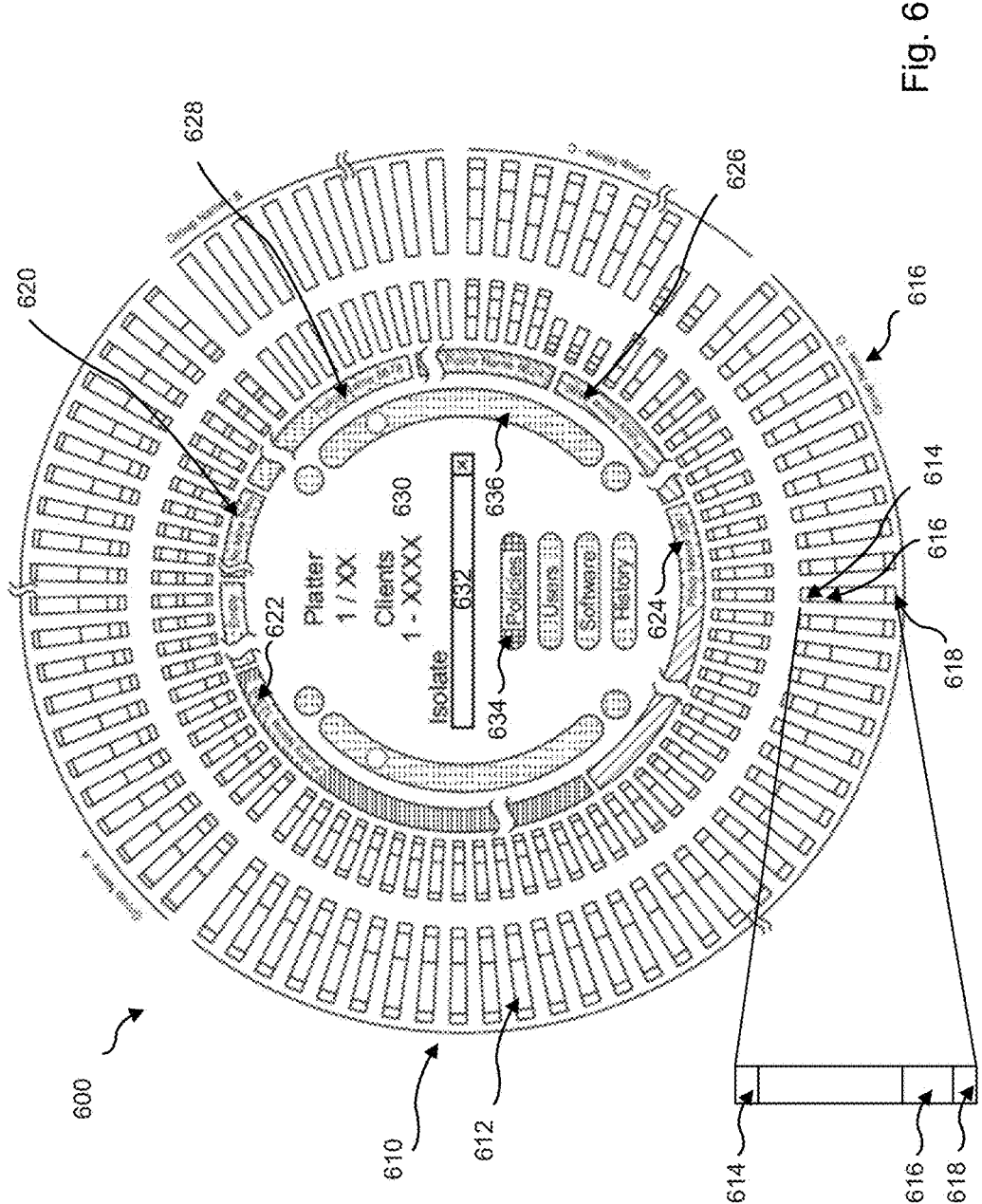
FIG. 6 shows a graphical user interface in accordance with an embodiment of the present disclosure.

FIG. 6 shows a graphical user interface 600 in accordance with an embodiment of the present disclosure. In some embodiments, the graphical user interface 600 may display an endpoint deployment map via display unit 370. The interface 600 may have a plurality of regions or areas displaying different information in a variety of formats. For instance, the interface 600 may have a circular arrangement with a central portion 630 and an outer portion 610 for displaying information about deployment across a network. For example, the interface 600 may display endpoints such as clients within the network, users within the network, or any other device, component or deployment within the network. FIG. 6 shows one instance of an interface 600 having two rings of endpoints. However, the interface 600 is not limited to two rings and may show any number of concentric rings extending away from a center of the interface 600.

In some embodiments, the interface 600 may display a plurality of endpoints organized together as groups in an outer region 610. For instance, an administrator may group certain endpoints into network groups according to location, department, or any other known factor, and the interface may accordingly display those endpoints together as shown in outer region 610. Within outer region 610, the plurality of endpoints associated with the group may be displayed in a radial pattern extending away from the central region 630. In some instances, the outer region 610 may display two rings of endpoints. However, the interface 600 is not limited to two rings and may show any number of concentric rings extending away from a center of the interface 600. The interface 600, for example, may display four rings of endpoints at one time.

In some embodiments, the endpoints may be represented as icons 612 within the outer region 610. Each icon may correspond to a single endpoint or a plurality of endpoints. Additionally, each icon may indicate various aspects of the endpoint(s) within that particular group (e.g., Group A). In some instances, the icons 612 may include predetermined segments for indicating the various aspects of the endpoint(s) such as a type of device associated with the endpoint(s). For example, the endpoint may be a desktop client, a laptop client, a mobile device such as a cell phone, a tablet, a server, or any other device deployed within the network. To easily indicate the device type of the endpoint, a first segment 614 of the icon 612 may be highlighted a particular color (e.g., red for desktop client, blue for mobile device, etc.).

The endpoint icons 612 may further indicate policies implemented on the endpoints. To easily indicate the policies implemented the endpoint(s), a second segment 616 of the icon 612 may be highlighted a particular color for a first policy and a third segment 618 of the icon 612 may be highlighted a particular color for a second policy. For example, antivirus policies may have a green color while firewall policies may have an orange color. Additionally, the second segment 616 may be associated with a first type of policy while the third segment 618 may be associated with a second type of policy. FIG. 6 further shows a close up view of an example of an icon 612 with the segments 614, 616, and 618. Accordingly, an administrator may easily visualize various device types and policies implemented across the endpoints deployed within the network.

The interface 600 may be constantly updated in accordance with any changes to endpoints. For instance, if an endpoint is no longer associated with a first group but is now associated with another group displayed on the interface 600, the interface 600 may by dynamically updated to reflect this change in group association. Additionally, when a policy applied to an endpoint has changed, the interface 600 may update the icon 612 associated with the endpoint to reflect the change.

The interface 600 may further provide a middle region 620 between the outer region 610 and a central region 630. In the middle region 620, the various policies associated with the endpoints displayed in the outer region 610 may be displayed. For example, when multiple policies have been implemented on the endpoints within the groups (e.g., Group A, Group B, etc.) displayed in the outer region 610, corresponding policy icons 622 may be displayed in the middle region 620. In some embodiments, the policy icons 622 may be displayed in a matching color to the policy shown on the icon 612.

Additionally, the policy icons 622/624/626/628 may be displayed in a ring format such that each policy icon 622/624/626/628 may have a length that corresponds to the number of endpoints having the policy implemented thereon. For example, when a first policy associated with policy icon 622 is implemented on more endpoints than a second policy associated with policy icon 624, the length of policy icon 622 in the middle region 620 may be longer than the length of policy icon 624. Each of the policy icons 622/624/626/628 may be selected as described below with respect to FIG. 11. Accordingly, an administrator may easily recognize common policies implemented across the endpoints within the network and select the endpoints associated with those policies.

In the central region 630 of the interface 600, various tools are provide to enable a user or administrator to manipulate the interface 600. In some embodiments, the central region 630 may include a text search box 632. The text search box 632 may enable a user or administrator to search through the endpoints based on any variety of set parameters. For example, an administrator may input a particular user name (e.g., John Doe) into the text box 632 and the endpoint(s) associated with that particular user name may be displayed and/or highlighted in the outer region 610. Alternatively, an administrator may input a particular software name into the text box 632 and the endpoint(s) having the software installed thereon may be displayed and/or highlighted in the outer region 610. The text search is not limited to user names and software and may be any number of various endpoint aspects established by an administrator (e.g., group, location, department, device type, operating system, etc.).

The central region 630 may further provide selectable visualization mode icons 634. Upon selection of one of the visualization mode icons 634, the information displayed in the outer region 610 may be changed. For example, when a policies mode icon is selected, policies associated with the various endpoints may be displayed in the outer region 610 as described above. Alternatively, when a users mode icon is selected, user information associated with the various endpoints may be displayed in the outer region 610 as described below with respect to FIG. 13. Additionally, when a software mode icon is selected, software information associated with the various endpoints may be displayed in the outer region 610 as described below with respect to FIG. 15. Further, when a history mode icon is selected, event information associated with the various endpoints may be displayed in the outer region 610. In some embodiments, the event information may be associated with an outbreak of malware or viruses across the network.

The central region 630 may additionally provide sliders 636 to view various subsets of endpoint clients within the network. In some instances, the outer region 610 may display information on a subset of endpoint clients within a larger network. These subsets of endpoint clients may be arranged in views known as platters. For example, the outer region 610 of platter 1 of 10 may display information on 100 endpoint clients (e.g., 1-100) out of a total of 1000 endpoint clients at one time. To view a different subset of endpoint clients, an administrator or user may manipulate sliders 636 to shift between different platters or subsets of endpoint clients (e.g., platter 5 showing endpoint clients 501-600). Additionally, the central region 630 may indicate which of the platters and endpoints are currently being displayed out of the total number of platters and endpoints in the network (e.g., Platter 1/10 and Clients 1-100). Accordingly, a user or administrator may easily view the endpoints deployed across the network.

Figure 7:
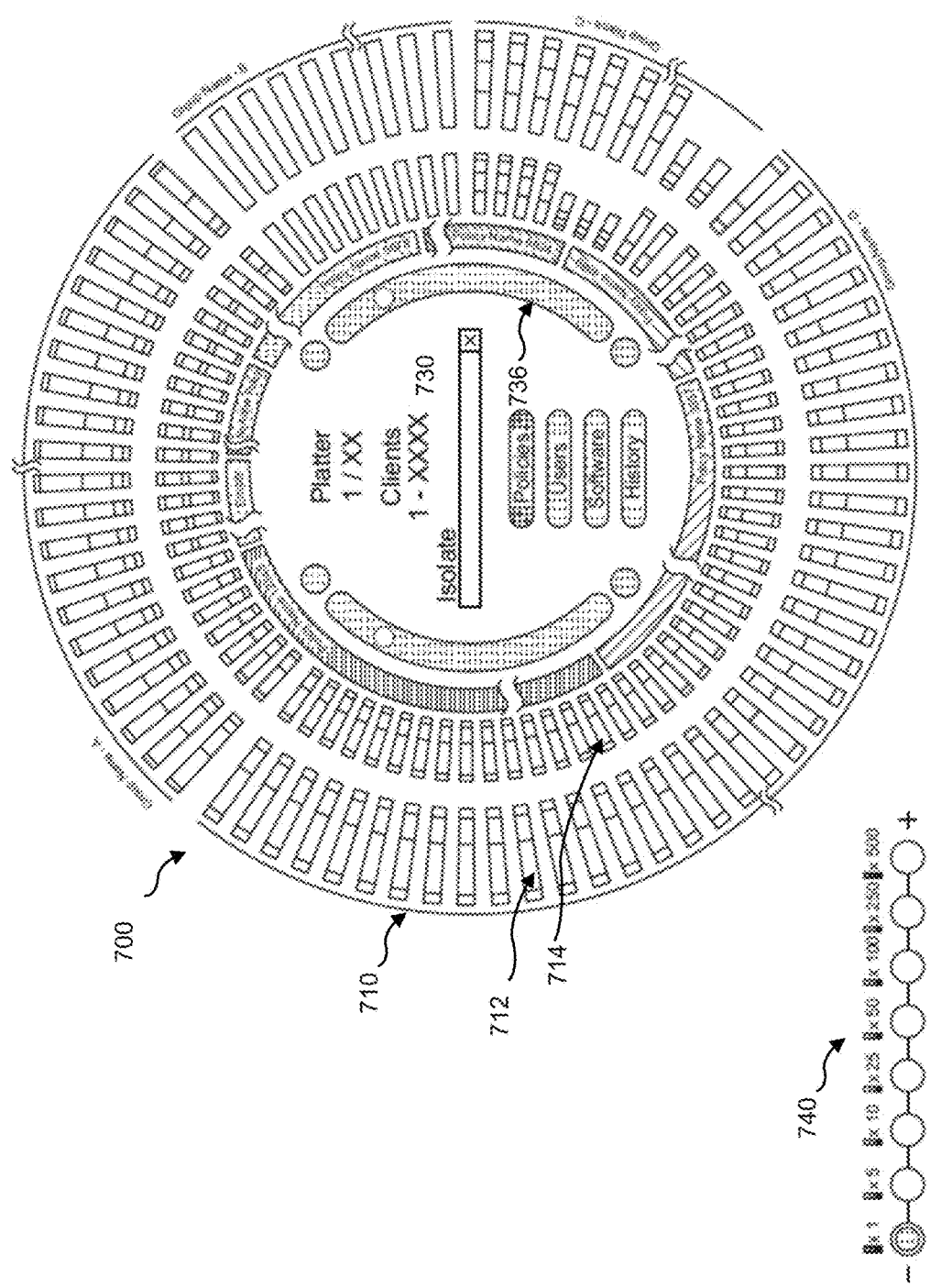
FIG. 7 shows a graphical user interface in accordance with an embodiment of the present disclosure.

FIG. 7 shows a graphical user interface 700 in accordance with an embodiment of the present disclosure. In some embodiments, the graphical user interface 700 may display an endpoint deployment map via display unit 370. The interface 700 may further include a magnification selector 740. In some instances, the interface 700 may display a plurality of endpoints in radially extending rows in an outer region 710 where each icon is associated with a single endpoint device or user. However, upon zooming into by modification of the magnification selector 740 each icon may now be associated with multiple endpoints having similar profiles or implementations.

The magnification selector 740 may provide for any level or interval of magnification. In some embodiments, the intervals may be 1, 5, 10, 25, 50 100, 250, and 500. For example, when a user selects a ×5 zoom, each icon may be associated with five discrete endpoints deployed in the network having similar profiles. In some embodiments, the profiles may be a same policy, software implementation, device category, physical location, or any other profile association. Further, when a user selects a ×500 zoom, each icon may be associated with five hundred discrete endpoints deployed in the network having similar profiles.

The magnification selector 740 provides a user or administrator another way of easily view the endpoints deployed across the network in conjunction with the sliders 636 discussed above. For example, when 1000 endpoints are deployed in a network and 50 are presently displayed in the outer region 710, a user may either manipulate the slider 736 to view the various endpoints in 20 different platters or may adjust the view by selecting a different magnification via magnification selector 740. Using the example discussed above, when a user adjusts the magnification from ×1 to ×10, each endpoint presently displayed in outer region 710 may correspond to 10 endpoints such that information on a first 500 endpoints may be display in outer region 710 while displaying a first platter. A user may then manipulate sliders 736 to view the remaining 500 endpoints while displaying a second platter. Accordingly, a user or administrator may be able to easily view a large number of endpoints at one time and also easily view all of the endpoints in the network.

Figure 8:
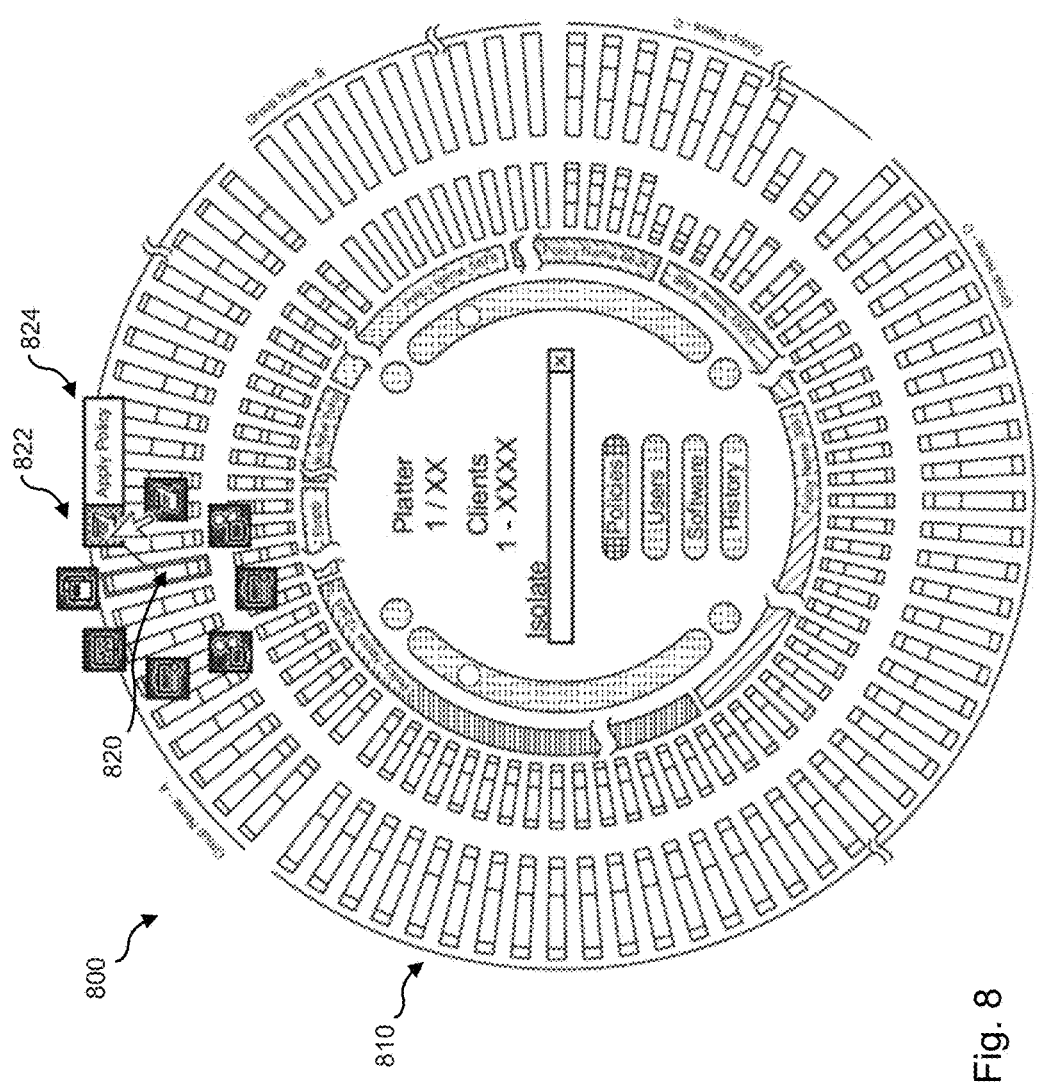
FIG. 8 shows a graphical user interface in accordance with an embodiment of the present disclosure.

When a user selects an endpoint and invokes a menu of options for that endpoint, the interface shown in FIG. 8 may be displayed. In some embodiments, the display may transition from the interface of FIG. 7 to the interface of FIG. 8. However, the display may also transition to the interface of FIG. 8 from any other the other interfaces described herein.

FIG. 8 shows a graphical user interface 800 in accordance with an embodiment of the present disclosure. In some embodiments, the graphical user interface 800 may display an endpoint deployment map via display unit 370. A user or administrator may select any one endpoint displayed in an outer region 810 of the interface 800. Upon selection of the single endpoint 812, the interface 800 may also provide a menu of options with respect to the selected endpoint 812.

The menu of options 820 may be used by a user or administrator to control or modify aspects of the selected endpoint 812 such as tracking health statistics, applying a policy or editing a previously applied policy, performing maintenance, implementing new software privileges or modifying previous software privileges, and controlling a variety of other aspects relevant to the endpoint. In some embodiments, the menu of options 820 may be displayed in a ring of selectable icons 822 around the selected endpoint 812. Upon selection of one of the menu icons 822, an additional window 824 may be displayed in relation to the selected menu icon 822. The additional window 824 may display additional information for controlling or monitoring the selected endpoint.

Figure 9:
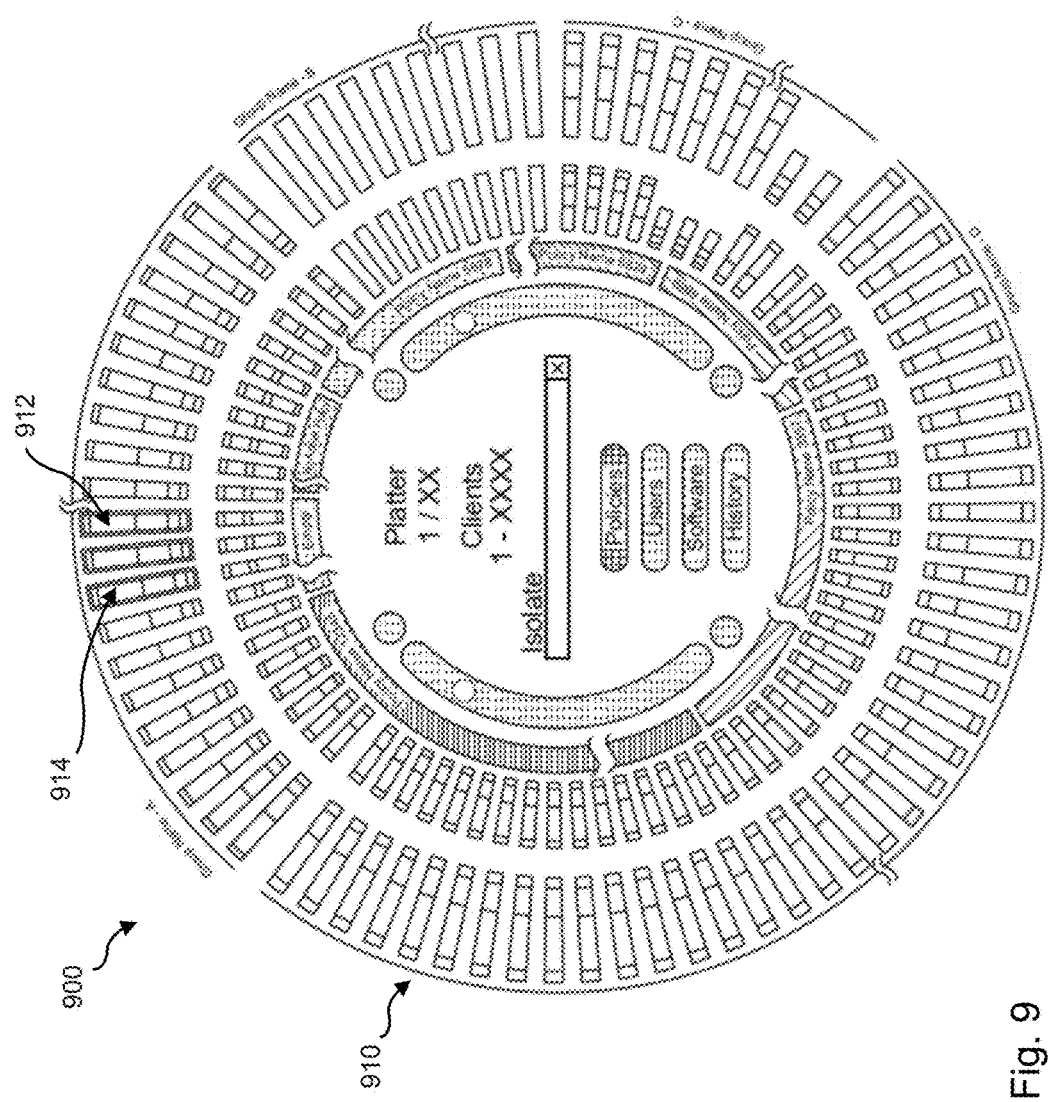
FIG. 9 shows a graphical user interface in accordance with an embodiment of the present disclosure.

When a user selects multiple endpoints, the interface shown in FIG. 9 may be displayed. In some embodiments, the display may transition from the interface of FIG. 8 to the interface of FIG. 9. However, the display may also transition to the interface of FIG. 9 from any other the other interfaces described herein.

FIG. 9 shows a graphical user interface 900 in accordance with an embodiment of the present disclosure. In some embodiments, the graphical user interface 900 may display an endpoint deployment map via display unit 370. The interface 900 may also provide a user or administrator with the ability to select multiple endpoints in an outer region 910.

The selection of multiple endpoints may be performed by individually selecting a plurality of endpoints. In one embodiment, the multiple endpoints may be selected by a user or administrator using an I/O device such as a mouse and keyboard or via a touchscreen interface. For instance, a user may select a first endpoint, hold a predetermined key on a keyboard (e.g., the shift key), and select additional endpoints. In other instances, a user may draw an outline around endpoints desired to be selected via an I/O device or via a touchscreen.

In additional instances, a user may select a first endpoint and based on a specific aspect of the first endpoint, additional endpoints sharing that aspect may be automatically selected. In some embodiments, after selecting a plurality of endpoints, an administrator may create a new group or subgroup and add those selected endpoints to that group.

Figure 10:
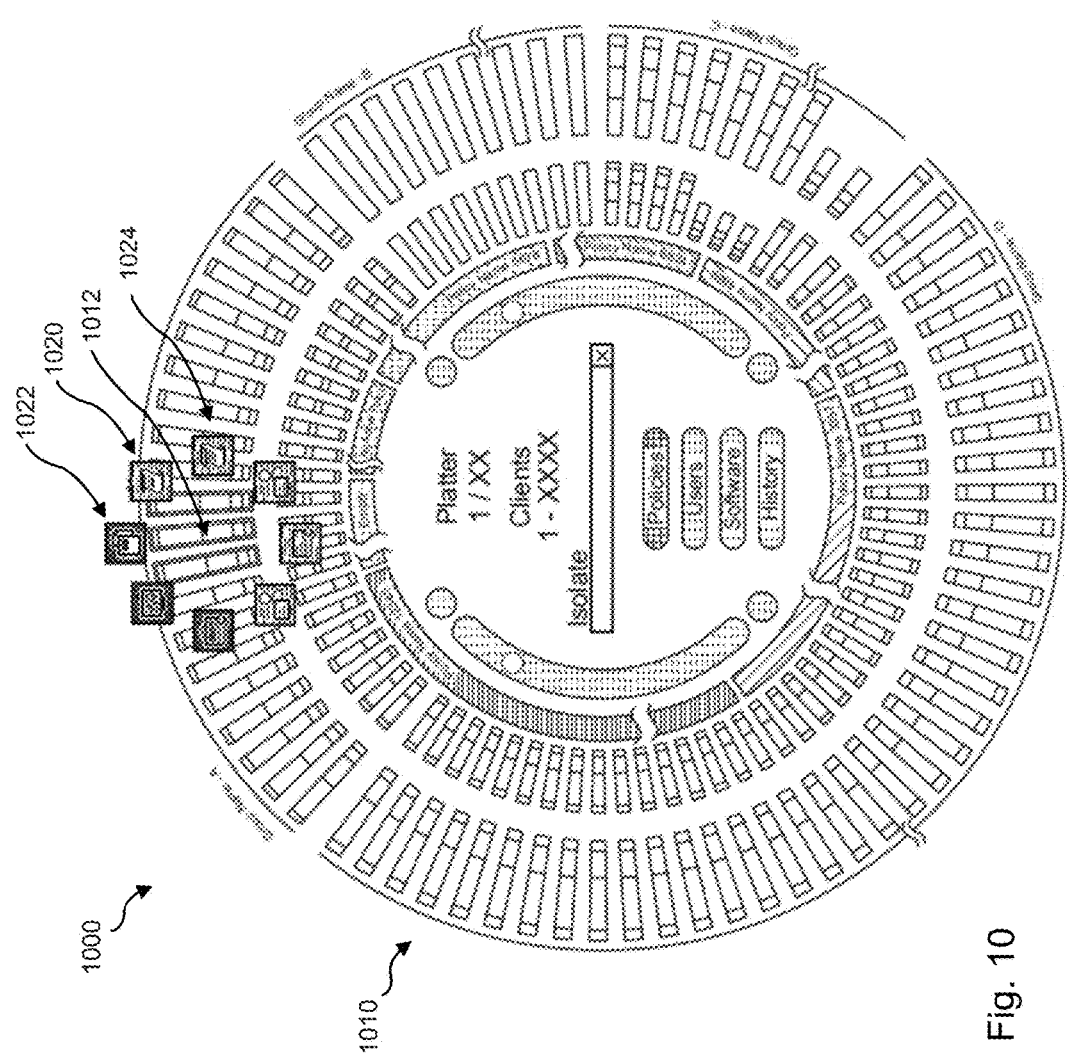
FIG. 10 shows a graphical user interface in accordance with an embodiment of the present disclosure.

When a menu is activated after selecting multiple endpoints, the interface shown in FIG. 10 may be displayed. In some embodiments, the display may transition from the interface of FIG. 9 to the interface of FIG. 10.

FIG. 10 shows a graphical user interface 1000 in accordance with an embodiment of the present disclosure. In some embodiments, the graphical user interface 1000 may display an endpoint deployment map via display unit 370. As described above with respect to FIG. 9, a user or administrator may select a plurality endpoints displayed in an outer region 910/1010 of the interface 900/1000. Upon selection of the plurality of endpoints 1012, the interface 1000 may also provide a menu of options 1020 with respect to the selected endpoints 1012. In some instances, the menu of options 1020 for the selected endpoints may be similar to the menu of options 820 for a single selected endpoint described above.

The menu of options 1020 may be used by a user or administrator to control or modify aspects of the selected endpoints 1012 such as tracking health statistics, applying a policy or editing a previously applied policy, performing maintenance, implementing new software privileges or modifying previous software privileges, and controlling a variety of other aspects relevant to the endpoints. In some embodiments, the menu of options 1020 may be displayed in a ring of selectable icons 1022 around at least one of the selected endpoints 1012. The available options in the menu 1020 may vary depending on the relationships between the endpoints selected. For example, when the selected endpoints have common properties (e.g., policies), those properties may be modified across all of the endpoints. However, when the selected endpoints do not have a specific common property (e.g., common user), then the menu option to modify aspects of that property (e.g., user rights) may not be available in menu 1020.

Figure 11:
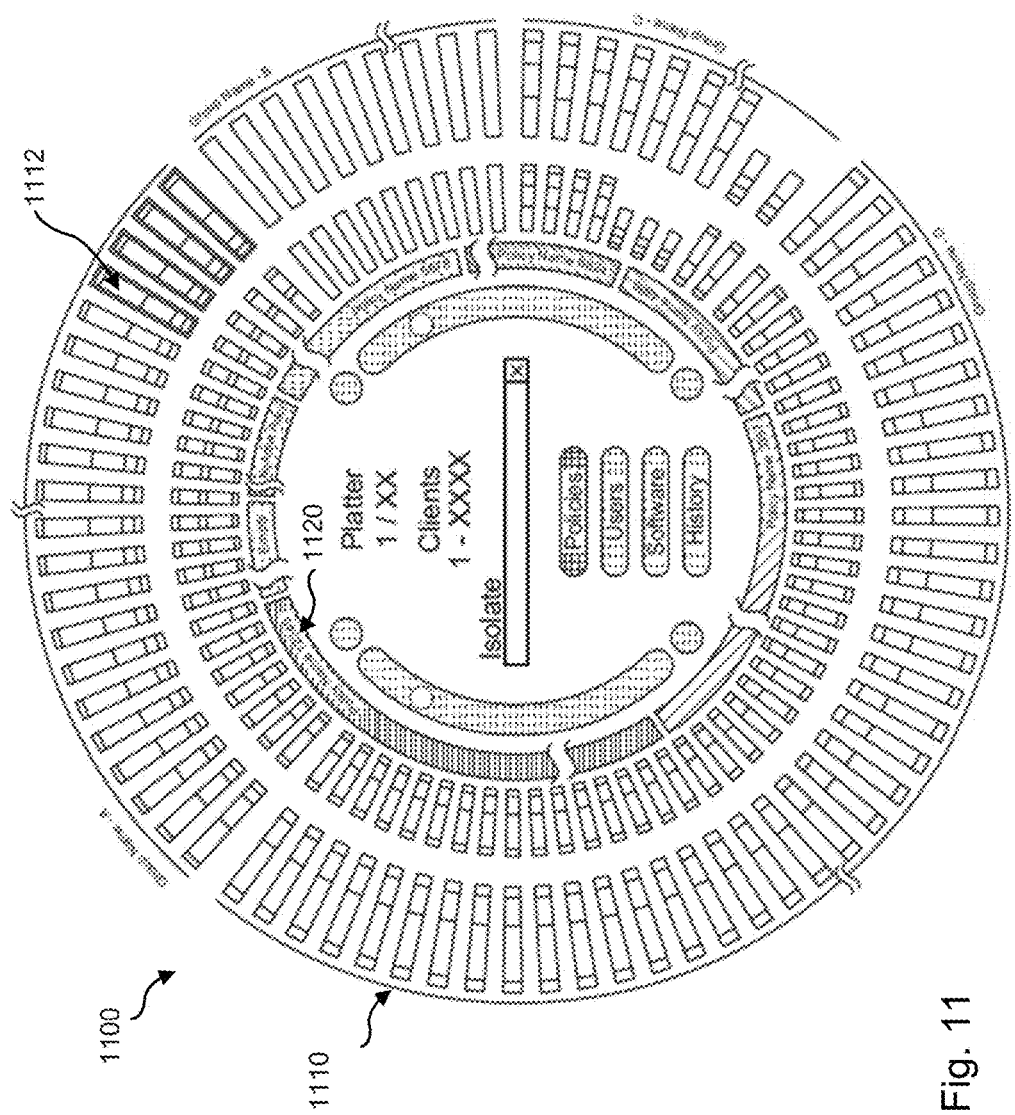
FIG. 11 shows a graphical user interface in accordance with an embodiment of the present disclosure.

When a user selects endpoints that share a common policy, the interface shown in FIG. 11 may be displayed. In some embodiments, the display may transition from the interface of FIG. 10 to the interface of FIG. 11. However, the display may also transition to the interface of FIG. 11 from any other the other interfaces described herein.

FIG. 11 shows a graphical user interface 1100 in accordance with an embodiment of the present disclosure. In some embodiments, the graphical user interface 1100 may display an endpoint deployment map via display unit 370. In some embodiments, the interface 1100 may display a plurality of endpoints sharing a policy. For instance, a first endpoint may have a particular policy applied while a second endpoint also has the same policy applied. Upon selection of the policy display in the middle region 1120 each endpoint currently displayed in the outer region 1110 that shares the policy may be selected. In some instances, the endpoints may span across various groups displayed in the outer region 1110. Accordingly, an administrator may easily select endpoints sharing a common policy for monitoring and control even when those endpoints span across different groups across a wide network.

Figure 12:
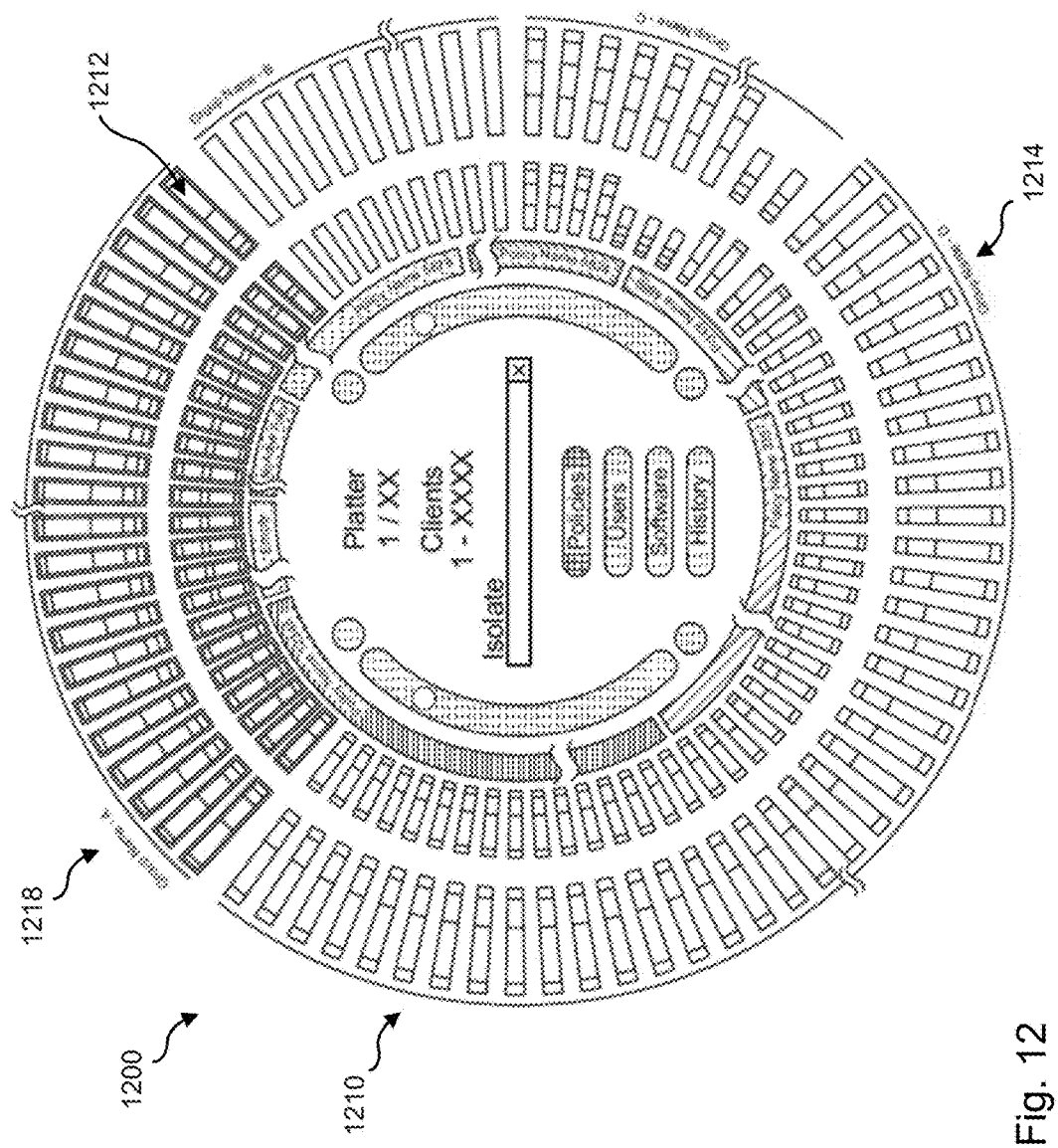
FIG. 12 shows a graphical user interface in accordance with an embodiment of the present disclosure.

When a user selects endpoints that are arranged within a particular group, the interface shown in FIG. 12 may be displayed. In some embodiments, the display may transition from the interface of FIG. 11 to the interface of FIG. 12. However, the display may also transition to the interface of FIG. 12 from any other the other interfaces described herein.

FIG. 12 shows a graphical user interface 1200 in accordance with an embodiment of the present disclosure. In some embodiments, the graphical user interface 1200 may display an endpoint deployment map via display unit 370. In some embodiments, the interface 1200 may display endpoints arranged by shared group. For instance, an administrator may assign endpoints within the network to various groups based on any number of factors such as physical location, department, user privileges, data access, etc.

In accordance with those endpoint group assignments, the interface 1200 may display the endpoints in an outer region 1210 in groups. A corresponding name 1218 for each group may be displayed with the associated endpoints. Additionally, when endpoints have not been associated with a particular group, those endpoints may be displayed together with an indication that they have not yet been assigned to a group. In some instances, the group name 1218 may be displayed just outside of the outer region 1210. Furthermore, a user or administrator may select all of the endpoints 1212 within the group by selecting the group name 1218. Accordingly, an administrator may easily select endpoints within a particular group for monitoring and control.

Figure 13:
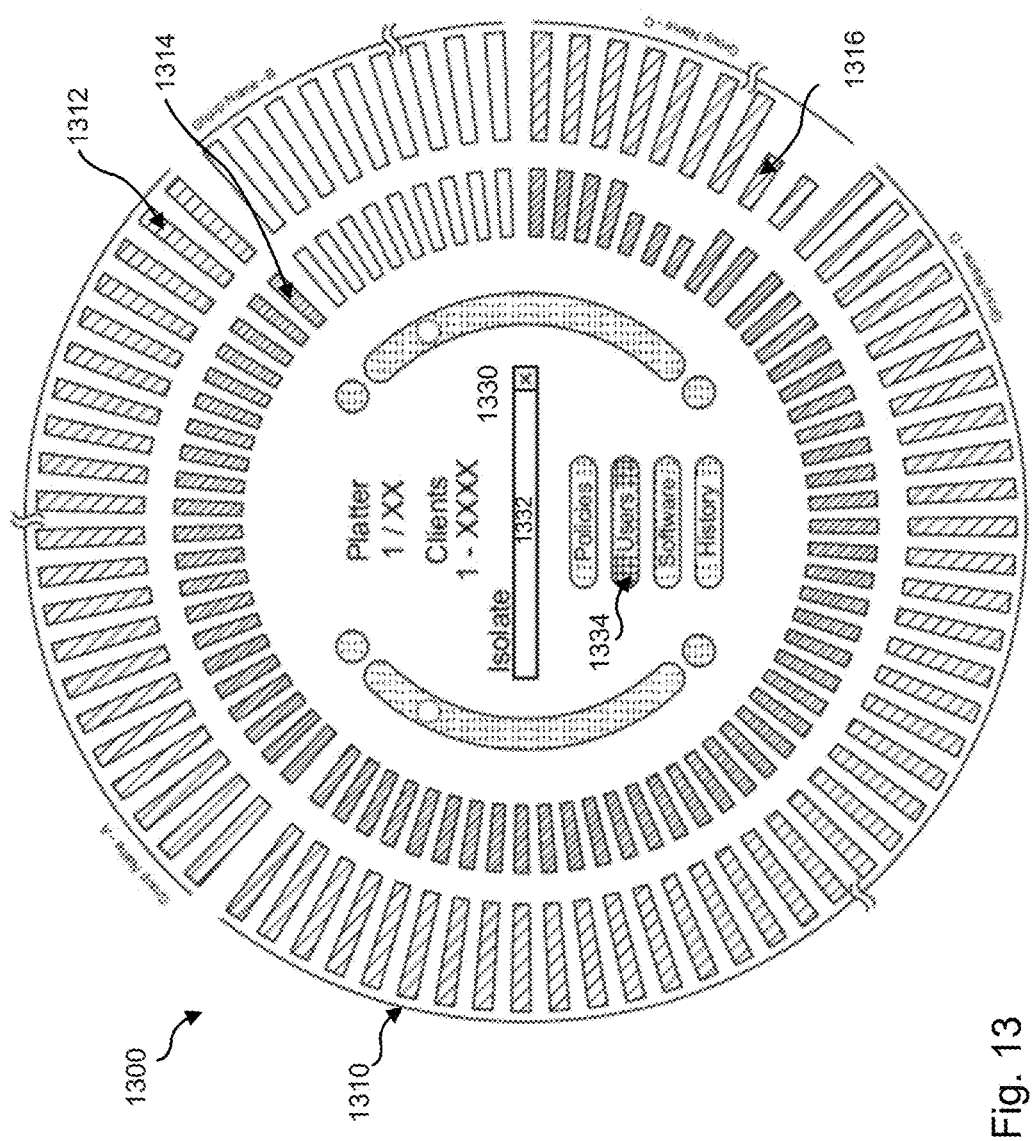
FIG. 13 shows a graphical user interface in accordance with an embodiment of the present disclosure.

When a user or administrator selects the user visualization mode icon 634 in the central region 630 of the interface, the interface shown in FIG. 13 may be displayed. In some embodiments, the display may transition from the interface of FIG. 12 to the interface of FIG. 13. However, the display may also transition to the interface of FIG. 13 from any other the other interfaces described herein.

FIG. 13 shows a graphical user interface 1300 in accordance with an embodiment of the present disclosure. In some embodiments, the graphical user interface 1300 may display an endpoint deployment map via display unit 370. The interface 1300 may display users within the network instead of endpoints, as described above with respect to FIG. 6.

In some instances, the interface 1300 may display users 1312/1314 in a radial pattern in an outer region 1310 as shown in FIG. 13 and similar to that described above with respect to endpoints in FIG. 6. The interface 1300 may similarly distribute the users by group (e.g., Group A, Group B, Group C, etc.) and dynamically adjust the display of users if they move from one group to another. FIG. 13 shows one instance of an interface 1300 having two rings of users. However, the interface 1300 is not limited to two rings and may show any number of concentric rings extending away from a center of the interface 1300. The interface 1300, for example, may display four rings of users at one time.

Additionally, the users 1312/1314 may be displayed in different ways to convey information about the users. For example, the first radial row of users may have a dark color indicating that the users are power users with multiple associated devices (e.g., desktop client, laptop client, tablet, mobile device, etc.). Users in a second row or third row further away from the central region 1330 may be displayed in lighter indicating fewer devices being associated with those users.

The functionality of the interface 1300 may be the same as described above with respect to endpoints. However, the interface 1300 enables an administrator to instead easily visualize the users within the network. For instance, an administrator may input search terms into a text box 1332 of a central region 1330 of the interface 1300 to search through the displayed users. The central region 1330 may also display the users presently display via the interface 1300 (e.g., 1-100) and may also indicate a platter number (e.g., 1/10) similar to the endpoints described above. An administrator may also select one or a plurality of users and manipulate or modify those users via a menu as described below with respect to FIG. 14. Accordingly, an administrator may easily visualize, monitor, and control users within the network.

Figure 14:
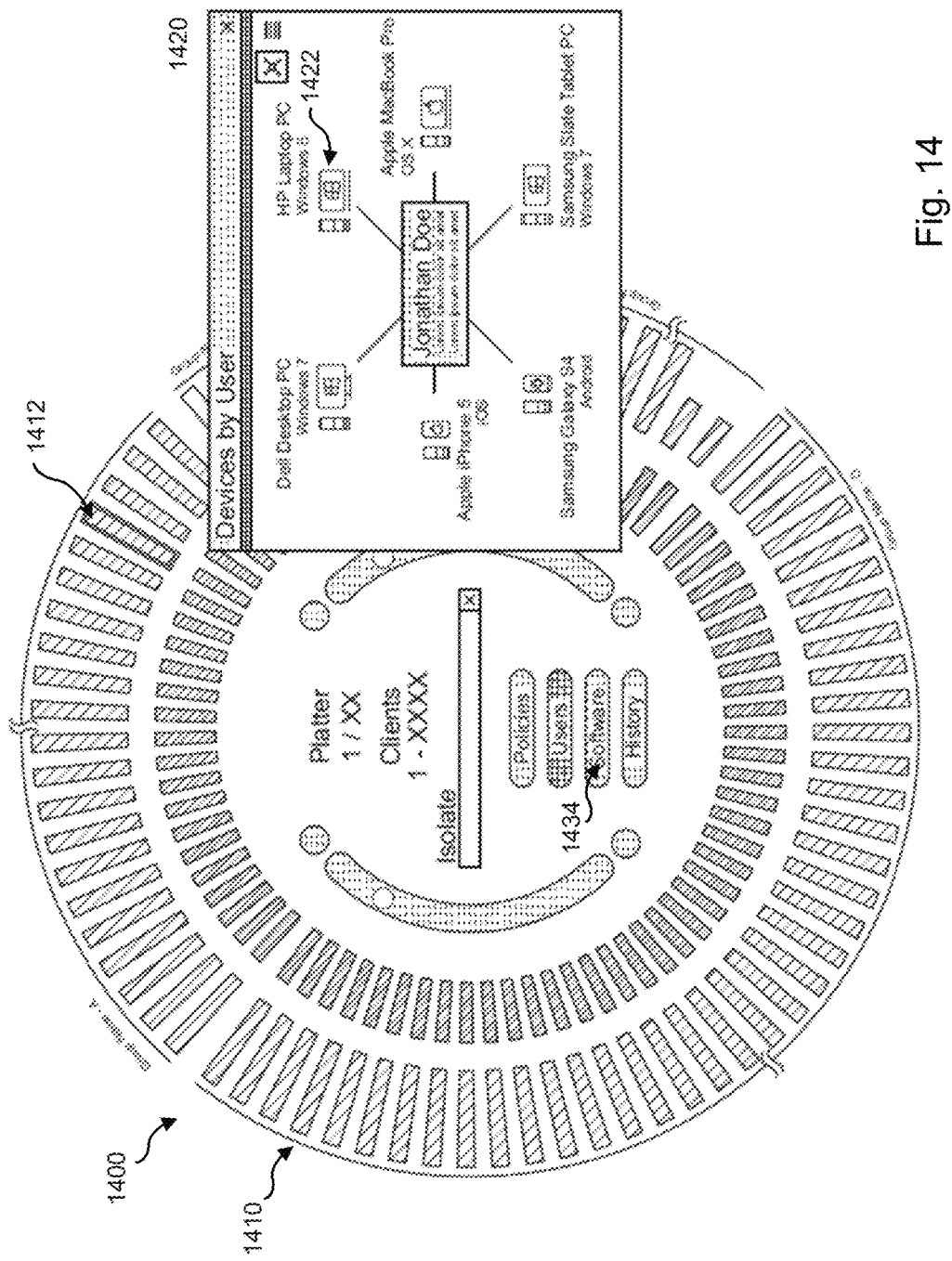
FIG. 14 shows a graphical user interface in accordance with an embodiment of the present disclosure.

When a user selects a menu option for at least one selected user, the interface shown in FIG. 14 may be displayed. In some embodiments, the display may transition from the interface of FIG. 13 to the interface of FIG. 14. However, the display may also transition to the interface of FIG. 14 from any other the other interfaces described herein.

FIG. 14 shows a graphical user interface 1400 in accordance with an embodiment of the present disclosure. In some embodiments, the graphical user interface 1400 may display an endpoint deployment map via display unit 370.

In some instances, the interface 1400 may display users in a radial pattern in an outer region 1410 similar to describe above with respect to FIG. 13. Additionally, interface 1400 may display a menu of options 1420 for at least one user 1412 selected via the interface 1400. For example, the interface 1400 may display a menu 1420 indicating information associated with a selected user 1412. In some embodiments, the menu 1420 may display devices (e.g., desktop client, laptop client, mobile device, etc.) 1422 associated with the selected user 1412.

The menu 1420 may also display information (e.g., type of hardware, type of operating system, etc.) about each device 1422. The menu 1420 may display this information about each device 1422 similar to the endpoint icons 612 describes above with respect to FIG. 6. For instance, the menu 1420 may provide a text description of the device (e.g., Laptop PC), a visual representation of the device (e.g., illustration of a laptop), and a color coded icon indicating various aspect to the device (e.g., applied policies, device type, etc.). The menu 1420 may also display information about a plurality of users selected via interface 1400.

Figure 15:
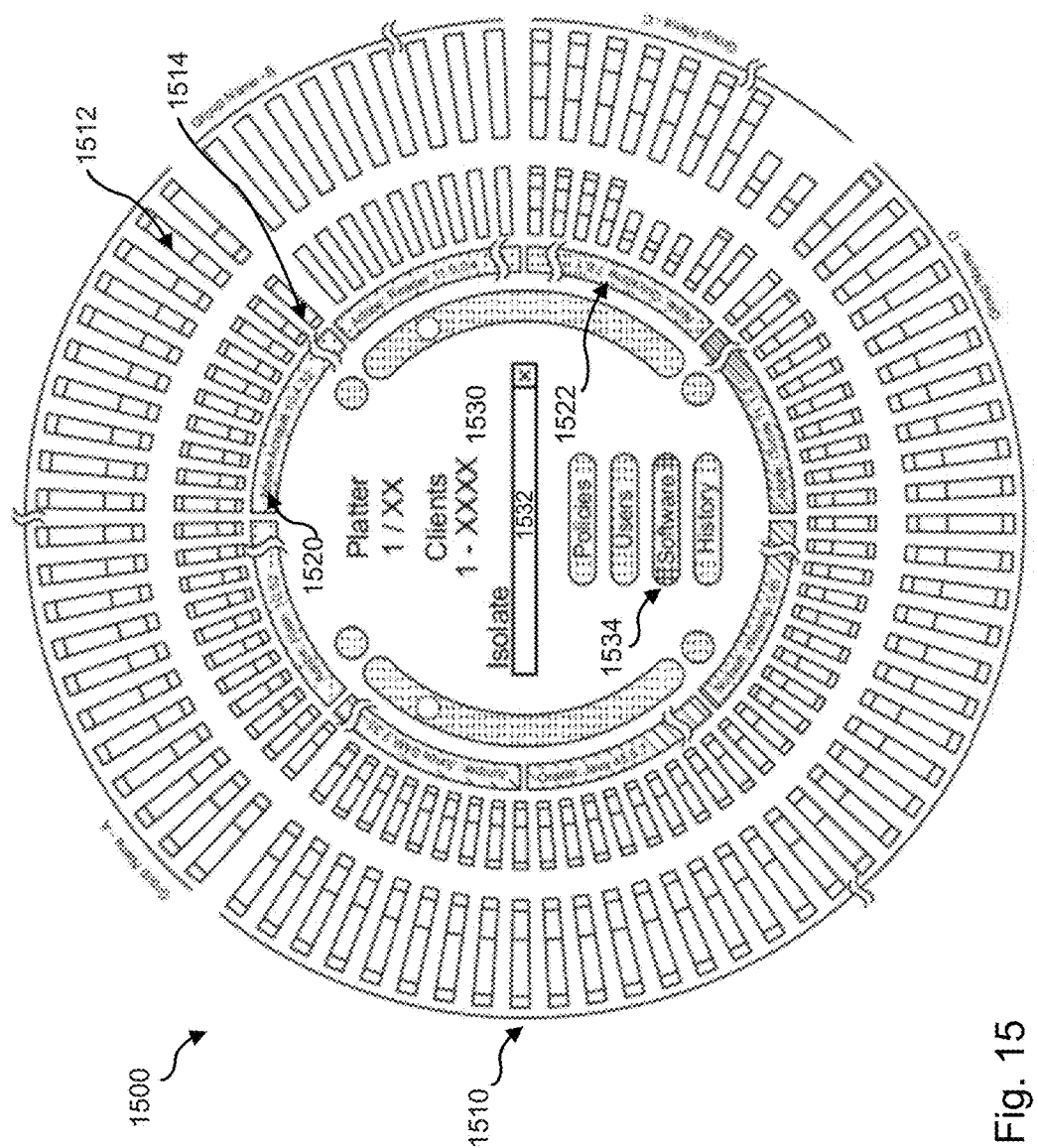
FIG. 15 shows a graphical user interface in accordance with an embodiment of the present disclosure.

When an administrator selects the software visualization mode icon 1434 in a central region of the interface 1400, the interface shown in FIG. 15 may be displayed. In some embodiments, the display may transition from the interface of FIG. 14 to the interface of FIG. 15. However, the display may also transition to the interface of FIG. 15 from any other the other interfaces described herein.

FIG. 15 shows a graphical user interface 1500 in accordance with an embodiment of the present disclosure. In some embodiments, the graphical user interface 1500 may display an endpoint deployment map via display unit 370.

In some instances, the interface 1500 may display software implemented on endpoints or associated with particular users as software implementation icons 1512/1514 in a radial pattern in an outer region 1510, as shown in FIG. 15. This display of software implementation icons 1512/1514 may be similar to the endpoint implementation and deployment shown and described above with respect to FIG. 6, and the users shown and described above with respect to FIG. 13. However, instead of displaying endpoint icons depicting color coding for aspects such as policies as described above with respect to FIG. 6, the interface 1500 may display software implementation icons 1512/1514 with color coding identifying software implemented on respective endpoints or associated with particular users.

The interface 1500 may similarly distribute the software implementation icons 1512/1514 by endpoint group (e.g., Group A, Group B, Group C, etc.) and dynamically adjust the display of software implementation if an endpoint or user moves from one group to another. Further, the interface 1500 may display selectable software icons 1522 in the middle region 1520 corresponding to various software implemented on the endpoints. The software icons 1522 may be displayed in a ring format such that each software icon 1522 may have a length that corresponds to the number of endpoints having the software implemented thereon. Upon selection of software icon 1522 in the middle region 1520, each endpoint currently displayed in the outer region 1510 that has the software implemented thereon may be selected. In some instances, the endpoints may span across various groups displayed in the outer region 1510.

FIG. 15 shows one instance of an interface 1500 having two rings of software implementation icons 1512/1514. However, the interface 1500 is not limited to two rings and may show any number of concentric rings extending away from a center of the interface 1500. The interface 1500, for example, may display four rings of software implementation icons at one time.

The functionality of the interface 1500 may be the same as described above with respect to endpoints. However, the interface 1500 enables an administrator to instead easily visualize and control the software implemented across a plurality of endpoints within the network. For instance, an administrator may input search terms into a text box 1532 of a central region 1530 of the interface 1500 to search through the displayed software implementations. The central region 1530 may also indicate the endpoints presently display via the interface 1500 (e.g., 1-100) and may also indicate a platter number (e.g., 1/10) as described above. An administrator may also select one or a plurality of software implementation icons and manipulate or control the associated software via a menu as described below with respect to FIG. 16. Accordingly, an administrator may easily visualize, monitor, and control software implementations within the network.

Figure 16:
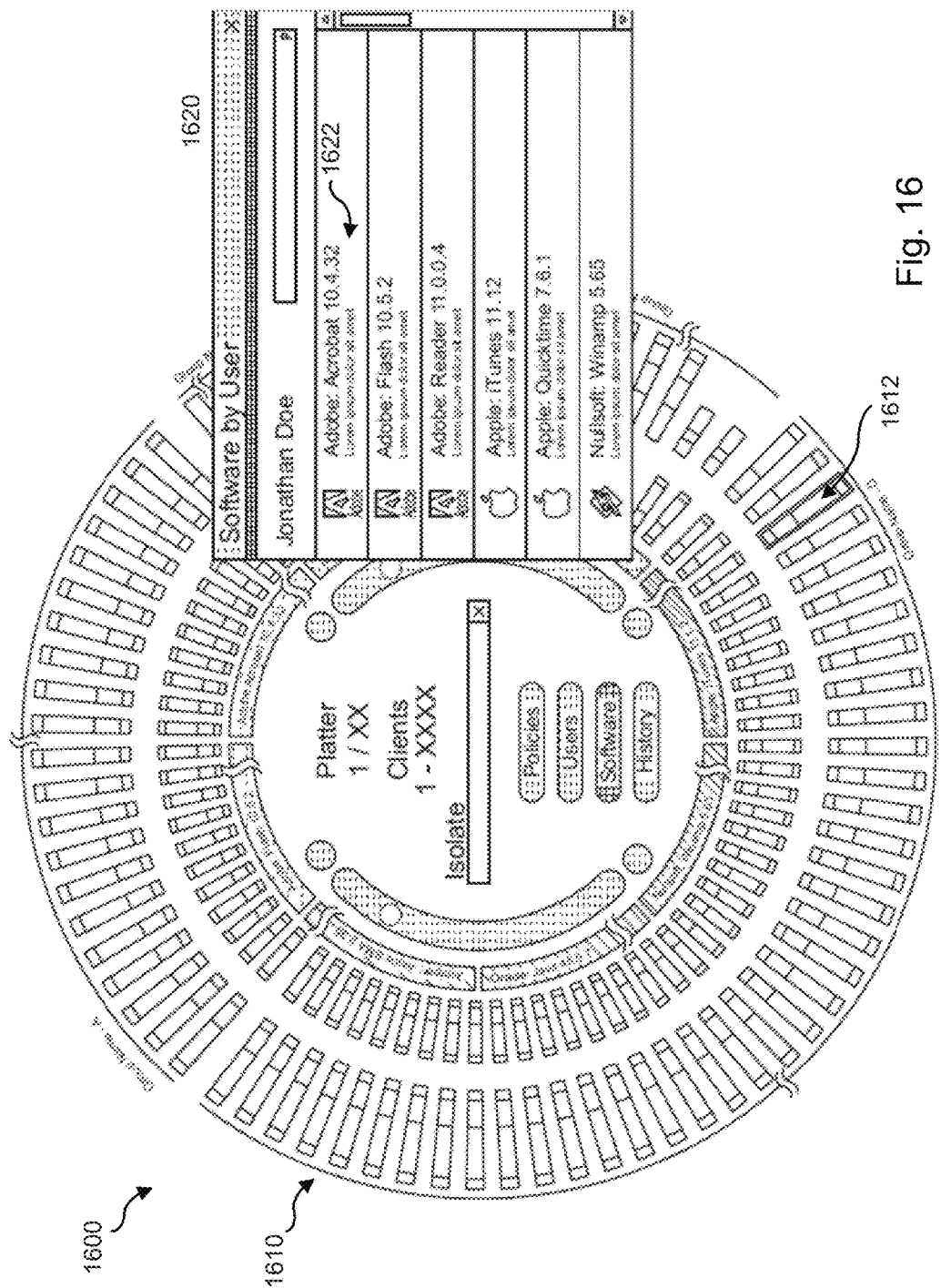
FIG. 16 shows a graphical user interface in accordance with an embodiment of the present disclosure.

When an administrator selects a menu option for at least one selected software implementation icon, the interface shown in FIG. 16 may be displayed. In some embodiments, the display may transition from the interface of FIG. 15 to the interface of FIG. 16. However, the display may also transition to the interface of FIG. 16 from any other the other interfaces described herein.

FIG. 16 shows a graphical user interface 1600 in accordance with an embodiment of the present disclosure. In some embodiments, the graphical user interface 1600 may display an endpoint deployment map via display unit 370.

In some instances, the interface 1600 may display software implementation icons in a radial pattern in an outer region 1610 similar to describe above with respect to FIG. 1. Additionally, interface 1600 may display a menu of options 1620 for at least one endpoint selected via the interface 1600. For example, the interface 1600 may display a menu 1620 indicating software associated with a selected endpoint 1612. In some embodiments, the menu 1620 may display details (software name, software version, etc.) 1622 about the software implemented on the selected endpoint 1612.

Through the menu 1620, an administrator may easily visualize and control software implemented on one or a plurality of selected endpoints or associated with particular users. Additionally, an administrator may modify, update, change, add, or remove any of the software implemented on the at least one selected endpoint or associated with particular users. For instance, an administrator may recognize that software on a particular endpoint has not been updated and may accordingly cause that software to be updated. Further, an administrator may recognize that a particular endpoint lacks certain software and may then cause that software to be installed. Thus, an administrator may easily visualize, monitor, and control software implementations within the network.

At this point it should be noted that presenting information on a graphical user interface in accordance with the present disclosure as described above may involve the processing of input data and the generation of output data to some extent. This input data processing and output data generation may be implemented in hardware or software. For example, specific electronic components may be employed in the presentation of information on a graphical user interface or similar or related circuitry for implementing the functions associated with presenting information on a graphical user interface in accordance with the present disclosure as described above. Alternatively, one or more processors operating in accordance with instructions may implement the functions associated with presenting information on a graphical user interface in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for presenting information on a graphical user interface comprising:
    displaying a deployment map via the graphical user interface on a display unit, wherein the deployment map includes an inner region and an outer region concentrically arranged, wherein:
        the outer region includes a plurality of deployment icons that each represent at least one associated endpoint in a network, the deployment icons being arranged in at least one ring around the inner region, and
        the inner region comprises a plurality of visualization mode icons that are configured to change a display mode of the outer region, the plurality of visualization mode icons including a policies mode icon that is configured such that when the policies mode icon is selected, policies associated with the endpoints will be displayed in the outer region, and a software mode icon that is configured such that when the software mode icon is selected, software information associated with the endpoints will be displayed in the outer region;
    displaying a magnification selector via the graphical user interface on the display unit, wherein the magnification selector includes at least three magnification selection icons including an ×1 icon, an ×10 icon, and an ×100 icon, wherein selection of the ×1 icon will cause each deployment icon to be associated with a single endpoint, selection of the ×10 icon will cause each deployment icon to be associated with ten endpoints, and selection of the ×100 icon will cause each deployment icon to be associated with one hundred endpoints, the endpoints associated with each deployment icon being grouped according to at least one shared profile characteristic;
    determining that an input has been detected with respect to one of the inner region of the deployment map, the outer region of the deployment map, and the magnification selector;
    determining a type of input when the input has been detected;
    generating an updated deployment map based on the determined type of input; and
    displaying the updated deployment map on the display unit.

2. The method of claim 1, wherein each deployment icon indicates information about the at least one associated endpoint in the network.

3. The method of claim 2, wherein the deployment map is displayed with the plurality of deployment icons in groups.

4. The method of claim 3, wherein the display of the deployment icons in groups is dynamically updated when a first endpoint is reassigned from a first group to a second group.

5. The method of claim 1, wherein each endpoint is at least one of a desktop client, a laptop client, a mobile device, and a tablet.

6. The method of claim 1, further comprising:
selecting one of the plurality of deployment icons, wherein the type of input is determined to be the selection of the one deployment icon;
displaying a menu of control options associated with the selected one deployment icon; and
implementing changes to at least one deployment deployed within the network based on a selection of a control option within the menu of control options.

7. The method of claim 1, wherein the inner region comprises a text search box to search the plurality of deployment icons currently displayed in the outer region.

8. The method of claim 7, wherein the inner region further comprises a slider to change a display of the outer region from a first subset of endpoints in the network to a second subset of endpoints in the network.

9. The method of claim 1, wherein the inner region includes a plurality of selectable visualization mode icons including a users mode icon and a history mode icon.

10. The method of claim 9, wherein when the users mode icon is selected, user information associated with the endpoints will be displayed in the outer region and when the history mode icon is selected, event information associated with the endpoints will be displayed in the outer region.

11. The method of claim 1, wherein when the at least one shared profile characteristic is a policy, software implementation, device category, or physical location.

12. A method for presenting information on a graphical user interface comprising:
displaying a deployment map of a plurality of deployment icons via the graphical user interface on a display unit, wherein the deployment map includes an inner region and an outer region concentrically arranged, wherein:
each deployment icon represents at least one associated endpoint in a network, the deployment map displaying the deployment icons in the outer region in at least one ring, and
the inner region comprises a plurality of visualization mode icons that are configured to change a display mode of the outer region, the plurality of visualization mode icons including a policies mode icon that is configured such that when the policies mode icon is selected, policies associated with the endpoints will be displayed in the outer region, and a software mode icon that is configured such that when the software mode icon is selected, software information associated with the endpoints will be displayed in the outer region;
displaying a magnification selector via the graphical user interface on the display unit, wherein the magnification selector includes at least three magnification selection icons including an ×1 icon, an ×10 icon, and an ×100 icon, wherein selection of the ×1 icon will cause each deployment icon to be associated with a single endpoint, selection of the ×10 icon will cause each deployment icon to be associated with ten endpoints, and selection of the ×100 icon will cause each deployment icon to be associated with one hundred endpoints;
determining that at least one of the deployment icons in the outer region has been selected;
displaying a menu of options for the selected at least one deployment icon, wherein the menu of options also includes information regarding the at least one endpoint associated with selected at least one icon;
determining whether an option within the menu of options has been selected; and
updating at least one endpoint based on the selected option.

13. The method of claim 12, wherein the menu of options includes at least one of a monitored statistic for the at least one endpoint associated with the selected deployment icon, an application of a policy to the at least one endpoint associated with the selected deployment icon, and user information for users associated with the at least one endpoint associated with the selected deployment icon.

14. The method of claim 12, further comprising:
determining at least one common property between a plurality of endpoints deployed within the network, wherein each deployment icon in the displayed deployment map corresponds to one of the plurality of endpoints; and
updating the menu of options in accordance with the determined at least one common property when at least two deployment icons have been selected.

15. The method of claim 12, wherein the menu of options displays the devices that are associated with the at least one endpoint associated with the selected at least one deployment icon.

16. At least one non-transitory processor readable storage medium storing a computer program of instructions configured to be readable by at least one processor for instructing the at least one processor to execute a computer process for performing a method for presenting information on a graphical user interface comprising:
displaying a deployment map via the graphical user interface on a display unit, wherein the deployment map includes an inner region and an outer region concentrically arranged, wherein:
the outer region includes a plurality of deployment icons that each represent at least one associated endpoint in a network, the deployment icons being arranged in at least one ring around the inner region, and
the inner region comprises a plurality of visualization mode icons that are configured to change a display mode of the outer region, the plurality of visualization mode icons including a policies mode icon that is configured such that when the policies mode icon is selected, policies associated with the endpoints will be displayed in the outer region, and a software mode icon that is configured such that when the software mode icon is selected, software information associated with the endpoints will be displayed in the outer region;
displaying a magnification selector via the graphical user interface on the display unit, wherein the magnification selector includes at least three magnification selection icons including an ×1 icon, an ×10 icon, and an ×100 icon, wherein selection of the ×1 icon will cause each deployment icon to be associated with a single endpoint, selection of the ×10 icon will cause each deployment icon to be associated with ten endpoints, and selection of the ×100 icon will cause each deployment icon to be associated with one hundred endpoints, the endpoints associated with each deployment icon being grouped according to at least one shared profile characteristic;

determining that an input has been detected with respect to one of the inner region of the deployment map, the outer region of the deployment map, and the magnification selector;

determining a type of input when the input has been detected;

generating an updated deployment map based on the determined type of input; and displaying the updated deployment map on the display unit.

17. A system for presenting information on a graphical user interface comprising:

one or more processors communicatively coupled to a network; wherein the one or more processors are configured to:

display a deployment map via the graphical user interface on a display unit, wherein the deployment map includes an inner region and an outer region concentrically arranged, wherein the outer region includes a plurality of deployment icons that each represent at least one associated endpoint in a network, the deployment icons being arranged in at least one ring around the inner region, and the inner region comprises a plurality of visualization mode icons that are configured to change a display mode of the outer region, the plurality of visualization mode icons including a policies mode icon that is configured such that when the policies mode icon is selected, policies associated with the endpoints will be displayed in the outer region, and a software mode icon that is configured such that when the software mode icon is selected, software information associated with the endpoints will be displayed in the outer region;

display a magnification selector via the graphical user interface on the display unit, wherein the magnification selector includes at least three magnification selection icons including an ×1 icon, an ×10 icon, and an ×100 icon, wherein selection of the ×1 icon will cause each deployment icon to be associated with a single endpoint, selection of the ×10 icon will cause each deployment icon to be associated with ten endpoints, and selection of the ×100 icon will cause each deployment icon to be associated with one hundred endpoints;

determine that an input has been detected with respect to one of the inner region of the deployment map, the outer region of the deployment map, and the magnification selector;

determine a type of input when the input has been detected;

generate an updated deployment map based on the determined type of input; and display the updated deployment map on the display unit.

* * * * *